US008892980B2

(12) United States Patent
Fillingim

(10) Patent No.: US 8,892,980 B2
(45) Date of Patent: Nov. 18, 2014

(54) APPARATUS, SYSTEM, AND METHOD FOR PROVIDING ERROR CORRECTION

(75) Inventor: Jeremy Fillingim, Salt Lake City, UT (US)

(73) Assignee: Fusion-io, Inc., Salt Lake City, UT (US)

( * ) Notice: Subject to any disclaimer, the term of this patent is extended or adjusted under 35 U.S.C. 154(b) by 164 days.

(21) Appl. No.: 13/160,755

(22) Filed: Jun. 15, 2011

(65) Prior Publication Data

US 2011/0314354 A1 Dec. 22, 2011

Related U.S. Application Data

(60) Provisional application No. 61/355,105, filed on Jun. 15, 2010.

(51) Int. Cl.
H03M 13/00 (2006.01)
G06F 11/10 (2006.01)
(52) U.S. Cl.
CPC ................................. *G06F 11/1048* (2013.01)
USPC ........................................................ 714/760
(58) Field of Classification Search
USPC .................................. 714/760, E11.034, 763
See application file for complete search history.

(56) References Cited

U.S. PATENT DOCUMENTS

| 5,754,563 | A | 5/1998 | White |
| 6,330,688 | B1 | 12/2001 | Brown |
| 6,601,211 | B1 | 7/2003 | Norman |
| 7,076,723 | B2 | 7/2006 | Saliba |
| 7,219,238 | B2 | 5/2007 | Saito et al. |
| 7,328,307 | B2 | 2/2008 | Hoogterp |
| 2002/0032891 | A1* | 3/2002 | Yada et al. ..................... 714/766 |
| 2005/0055621 | A1* | 3/2005 | Adelmann et al. ............ 714/758 |
| 2005/0172179 | A1* | 8/2005 | Brandenberger et al. ..... 714/718 |
| 2008/0072120 | A1* | 3/2008 | Radke ............................ 714/768 |
| 2008/0162791 | A1 | 7/2008 | Eldredge et al. |
| 2008/0195900 | A1* | 8/2008 | Chang et al. ................... 714/718 |
| 2008/0222490 | A1* | 9/2008 | Leung et al. ................... 714/763 |
| 2008/0244368 | A1 | 10/2008 | Chin et al. |
| 2009/0070651 | A1 | 3/2009 | Diggs et al. |
| 2009/0125790 | A1* | 5/2009 | Iyer et al. ....................... 714/773 |

(Continued)

FOREIGN PATENT DOCUMENTS

| JP | 11185210 | 7/1999 |
| KR | 20080088332 | 2/2008 |

(Continued)

OTHER PUBLICATIONS

"ECC Algorithm", Samsung Electronics Co., Ltd., pp. 8, Flash Planning Group, Memory Division.

(Continued)

*Primary Examiner* — Ajay Bhatia
*Assistant Examiner* — Thien D Nguyen
(74) *Attorney, Agent, or Firm* — Kunzler Law Group, PC

(57) ABSTRACT

An apparatus, system, and method are disclosed for providing error correction for a data storage device. A determination module determines an error-correcting code ("ECC") characteristic of the data storage device. An ECC module validates requested data read from the data storage device using a hardware ECC decoder. In response to the requested data satisfying a correction threshold, a software ECC decoder module validates the data using a software ECC decoder. The software ECC decoder is configured according to the ECC characteristic of the data storage device.

19 Claims, 11 Drawing Sheets

(56) References Cited

U.S. PATENT DOCUMENTS

| | | | |
|---|---|---|---|
| 2009/0144598 A1* | 6/2009 | Yoon et al. | 714/752 |
| 2009/0144600 A1 | 6/2009 | Perlmutter et al. | |
| 2009/0187803 A1 | 7/2009 | Anholt et al. | |
| 2010/0157674 A1* | 6/2010 | Cornwell et al. | 365/185.03 |
| 2010/0241928 A1* | 9/2010 | Kim et al. | 714/763 |
| 2010/0250836 A1* | 9/2010 | Sokolov et al. | 711/103 |
| 2010/0251068 A1* | 9/2010 | Lin et al. | 714/755 |
| 2010/0332895 A1* | 12/2010 | Billing et al. | 714/8 |
| 2011/0107188 A1* | 5/2011 | Dror et al. | 714/773 |
| 2011/0161784 A1* | 6/2011 | Selinger et al. | 714/768 |
| 2011/0194641 A1* | 8/2011 | Lim et al. | 375/295 |
| 2011/0283164 A1 | 11/2011 | Tang et al. | |
| 2012/0239868 A1 | 9/2012 | Ryan et al. | |

FOREIGN PATENT DOCUMENTS

| | | |
|---|---|---|
| KR | 20090037501 | 4/2009 |
| KR | 20090095641 | 9/2009 |
| WO | 2006029243 | 3/2006 |
| WO | 2007132457 | 11/2007 |
| WO | 2010045445 | 4/2010 |

OTHER PUBLICATIONS

"ECC Technologies, Inc. (ECC TEK) Company Profile", ECC Technologies, Inc., pp. 4.

"NAND Flash 101: An Introduction to NAND Flash and How to Design It in to Your Next Product", Micron, j2006, pp. 28, Technical Note, TN-29-19: NAND Flash 101 Introduction.

"ECC Technologies", StorageSearch.com, pp. 2.

"Error Correction Power for the Future", ECC Technologies, 2008-2010, pp. 2, Future Technology, http://www.ecctek.com/future.html.

Plank, James S., "A Tutorial on Reed-Solomon Coding for Fault-Tolerance in RAID-like Systems", University of Tennessee, pp. 19, Technical Report CS-96-332, Department of Computer Science, http://www.cs.utk.edu/plank/papers/CS-03-504.html.

U.S. Appl. No. 13/161,211, 2380.2.49US2, Office Action, Aug. 26, 2013.

U.S. Appl. No. 13/161,211, 2380.2.49US2, FAIPP Pre-Interview Communication, Apr. 18, 2013.

U.S. Appl. No. 13/161,211, 2380.2.49US2, Office Action, May 31, 2013.

Dan, Raz, "Implementing MLC NAND Flash for Cost-Effective, High-Capacity Memory", M-Systems White Paper, Sep. 2003, pp. 13, 92-SR-014-02-8L, Rev 1.1.

Gill, Binny S., "WOW: Wise Ordering for Writes—Combining Spatial and Temporal Locality in Non-Volatile Caches", IBM, 2005, pp. 14, 4th USENIX Conference on File and Storage Technologies.

U.S. Appl. No. 13/161,211, 2380.2.49US2, Office Action, Feb. 13, 2014.

U.S. Appl. No. 13/161,211, 2380.2.49US2, Final Office Action, Jul. 3, 2014.

"NAND Flash Memories for Spacecraft", ECC Technologies, Inc., May 13, 2010, pp. 22, Minnetonka, Minnesota, US.

Chen, Scott, "What Types of ECC Should be Used on Flash Memory?", Spansion, Nov. 27, 2007, pp. 6, Application No. XP-002535760.

2380.2.49pct2, Application No. PCT/US2011/040539, International Search Report and Written Opinion, Feb. 9, 2012.

2380.2.49pct2, Application No. PCT/US2011/040539, International Preliminary Report on Patentability, Jan. 3, 2013.

2380.2.49pct1, Application No. PCT/US2011/040534, International Preliminary Report on Patentability, Jan. 3, 2013.

2380.2.49pct1, Application No. PCT/US2011/040534, International Search Report and Written Opinion, Feb. 9, 2012.

Agrawal, Vikas, "ECC and Signal Processing Technology for Solid State Drives and Multi-bit Per Cell NAND Flash Memories", Forward Insights, Jan. 2010, pp. 174, Report No. FI-NFL-FSP-0110.

"Micron Unveils Innovative Flash Memory Devices That Extend the Life of NAND", Micron, Dec. 2, 2010, pp. 2, Press Release, http://news.micron.com/releasedetail.cfm?ReleaseID=534205.

Dan, Raz, "Implementing MLC NAND Flash for Cost-Effective, High-Capacity Memory", M-Systems, Sep. 2003, pp. 13, White Paper, 91-SR-014-02-8L, Rev 1.1.

\* cited by examiner

900

| | 902a | 902b | 902c | 902d | . . . | 902e |
|---|---|---|---|---|---|---|
| ECC Characteristic 902 | 11b3 | 17b8 | 23b3 | 39b4 | . . . | 159b24 |
| Software ECC Decoder Module 604 | 4-11 | 1-17 | 2-23 | 5-39 | . . . | 25-159 |
| Hardware ECC Decoder Module 322 | 1-3 | 1-8 | 1-3 | 1-4 | . . . | 1-24 |

|  | Minimum Read Size 1006 | Metadata Overhead 1008 | Performance/ Throughput 1010 | Runtime Data Integrity 1012 | Data Retention 1014 |
|---|---|---|---|---|---|
| Decreased Code Rate 1002 | Increase | Increase | Decrease | Increase | Increase |
| Increased Codeword Length 1004 | Increase | No Change | Decrease | Increase | Increase |

FIG. 10

APPARATUS, SYSTEM, AND METHOD FOR PROVIDING ERROR CORRECTION

CROSS-REFERENCES TO RELATED APPLICATIONS

This application claims priority to U.S. Provisional Patent Application No. 61/355,105 entitled "APPARATUS, SYSTEM, AND METHOD FOR PROVIDING ERROR CORRECTION" and filed on Jun. 15, 2010 for Jeremy Fillingim, which is incorporated herein by reference.

BACKGROUND

1. Field of the Invention

This invention relates to error-correcting codes and more particularly relates to error-correcting codes and data storage devices.

2. Description of the Related Art

Solid-state storage devices use solid-state media that inherently fails to store and retain data for a sufficient period of time without introducing bit errors. As the bit density of the solid-state memory media increases, the number of bit errors per amount of data stored and read can increase. The bit density for other types of data storage media, such as magnetic and optical storage media, is also increasing.

Due to increasing bit densities, changes in manufacturing and fabrication techniques, and other technical advances, the volume and type of data errors can change between data storage device product cycles. These changes can make otherwise compatible data storage devices incompatible with existing drivers or other software. Similarly, over the lifetime of a single data storage device, the volume and type of data errors can also change with age or with use conditions.

SUMMARY

From the foregoing discussion, it should be apparent that a need exists for an apparatus, system, and method that provide error correction for data storage devices. Beneficially, such an apparatus, system, and method would share error correction between hardware and software.

The present invention has been developed in response to the present state of the art, and in particular, in response to the problems and needs in the art that have not yet been fully solved by currently available data storage device error correction systems. Accordingly, the present invention has been developed to provide an apparatus, system, and method for providing error correction that overcome many or all of the above-discussed shortcomings in the art.

Methods are presented for providing error correction. In one embodiment, a method includes determining an error-correcting code ("ECC") characteristic of a data storage device. A method, in another embodiment, includes validating requested data read from the data storage device using a hardware ECC decoder. In a further embodiment, a method includes validating requested data read from the data storage device using a software ECC decoder based on the ECC characteristic in response to the data satisfying a correction threshold.

In certain embodiments, the method includes configuring the software ECC decoder to validate the requested data up to a software correction threshold number of data errors in the requested data. In one embodiment, the method includes correcting one or more errors in the requested data using the hardware ECC decoder in response to a detected number of errors in the requested data satisfying a hardware correction threshold of the correction threshold. In another embodiment, the method includes correcting one or more errors in the requested data using the software ECC decoder in response to a detected number of errors in the requested data satisfying a software correction threshold of the correction threshold. The software correction threshold, in one embodiment, is greater than the hardware correction threshold.

In one embodiment, the software ECC decoder corrects one or more data errors in the requested data up to the software correction threshold. The software ECC decoder, in a further embodiment, corrects the data errors in response to a detected number of the one or more data errors falling between the hardware correction threshold and the software correction threshold. In another embodiment, the hardware ECC decoder corrects a portion of the data errors up to the hardware correction threshold and the software ECC decoder corrects a portion of the data errors between the hardware correction threshold and the software correction threshold.

The hardware correction threshold, in one embodiment, is selected to correct data errors expected during runtime of the data storage device. The software correction threshold, in a further embodiment, is selected to correct data errors expected for a data retention time for the requested data. The ECC characteristic, in certain embodiments, includes an ECC codeword size selected from a plurality of supported ECC codeword sizes. The ECC codeword size, in one embodiment, satisfies a predetermined ratio between a level of data protection and a minimum read size. In another embodiment, the level of data protection associated with the ECC codeword size and the minimum read size associated with the ECC codeword size each increase with an increase in ECC codeword size.

An apparatus to provide error correction for a data storage device is provided with a plurality of modules configured to functionally execute the steps described above with regard to the provided method. These modules in the described embodiments include a determination module, a software ECC decoder module, an ECC module, and a decoder configuration module.

Apparatuses are presented to provide error correction for a data storage device. In one embodiment, a determination module is configured to determine an ECC characteristic of a data storage device. In one embodiment, a software ECC decoder module is configured to validate requested data read from the data storage device using a software ECC decoder in response to the data satisfying a correction threshold. The software ECC decoder module validates the requested data, in certain embodiments, based on the ECC characteristic that the determination module determines.

In one embodiment, the decoder configuration module configures the software ECC decoder module to validate the requested data up to a software correction threshold number of data errors in the requested data. In another embodiment, the decoder configuration module configures a hardware ECC decoder and/or a software ECC decoder module to operate in compliance with the ECC characteristic of the data storage device.

The ECC module, in one embodiment, validates requested data read from the data storage device using a hardware ECC decoder. In another embodiment, the hardware ECC decoder corrects one or more errors in the requested data in response to a detected number of errors in the requested data satisfying a hardware correction threshold of the correction threshold. The software ECC decoder module, in a further embodiment, corrects one or more errors in the requested data using the software ECC decoder in response to a detected number of errors in the requested data satisfying a software correction threshold of the correction threshold. In certain embodiment, the software correction threshold is greater than the hardware correction threshold.

In one embodiment, the software ECC decoder module corrects one or more data errors in the requested data up to the software correction threshold in response to a detected number of the one or more data errors falling between the hardware correction threshold and the software correction threshold. In another embodiment, the hardware ECC decoder corrects a portion of the data errors up to the hardware correction threshold and the software ECC decoder module corrects a portion of the data errors between the hardware correction threshold and the software correction threshold.

The hardware correction threshold, in certain embodiments, is selected to correct data errors expected during runtime of the data storage device. The software correction threshold, in another embodiment, is selected to correct data errors expected for a data retention time for the requested data. The ECC characteristic, in certain embodiments, includes an ECC codeword size selected from a plurality of supported ECC codeword sizes. The ECC codeword size, in one embodiment, satisfies a predetermined ratio between a level of data protection and a minimum read size. In another embodiment, the level of data protection associated with the ECC codeword size and the minimum read size associated with the ECC codeword size each increase with an increase in ECC codeword size.

A system of the present invention is also presented to provide error correction for a data storage device. The system may be embodied by a data storage device, a hardware ECC decoder, and an ECC module. In particular, the system, in a further embodiment, includes a host device and a second data storage device.

Systems are presented to provide error correction for a data storage device. In one embodiment, a system may include a data storage device, a hardware ECC decoder, and an ECC module. In one embodiment, the hardware ECC decoder is disposed in hardware of the data storage device, and is configured to validate requested data read from the data storage device. The ECC module, in certain embodiments, includes a determination module configured to determine an ECC characteristic of the data storage device, and a software ECC decoder module configured to validate requested data read from the data storage device using a software ECC decoder based on the ECC characteristic in response to the data satisfying a software correction threshold.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 9 is a schematic block diagram illustrating embodiments of error correction characteristics in accordance with the present invention;

FIG. 10 is a schematic block diagram illustrating embodiments of error correction characteristics in accordance with the present invention.

DETAILED DESCRIPTION OF THE INVENTION

Figure 1:
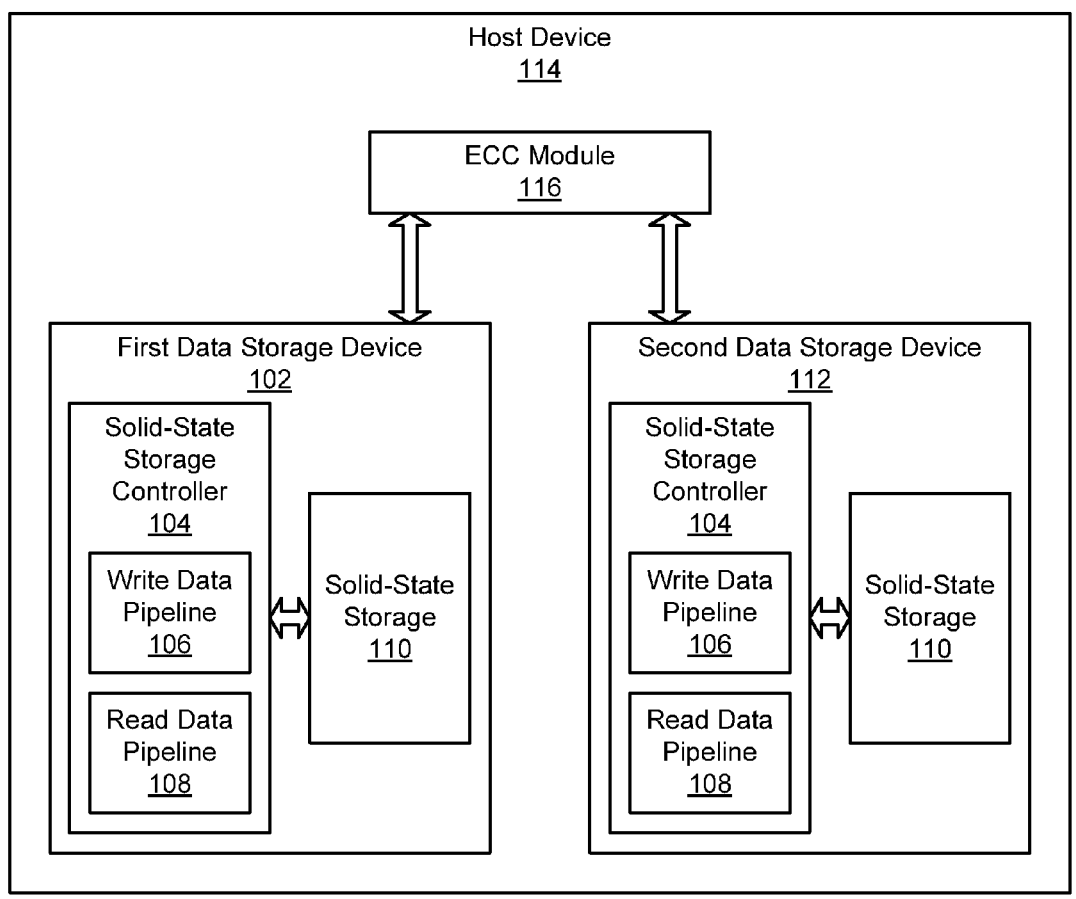
FIG. 1 is a schematic block diagram illustrating one embodiment of a system for providing error correction in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Solid-State Storage System

FIG. 1 depicts one embodiment of a system 100 for providing error correction in accordance with the present invention. The system 100, in the depicted embodiment, includes a host device 114, an error-correcting code ("ECC") module 116, a first data storage device 102, and a second data storage device 112. The first and second data storage devices 102, 112, in the depicted embodiment, each include a solid-state storage controller 104, a write data pipeline 106, a read data pipeline 108, and solid-state storage media 110, which are described below.

In one embodiment, the system 100 divides ECC decoding capabilities between software executing on the host device 114 and hardware of the data storage devices 102, 112, such as the solid-state storage controller 104. In another embodiment, the system 100 supports data storage devices 102, 112 that each may have one or more of several different ECC characteristics. The system 100, in a further embodiment, configures or adjusts one or more ECC characteristics for the data storage devices 102, 112.

In the depicted embodiment, the system 100 includes two data storage devices 102, 112. In other embodiments, the system 100 may include a single data storage device 102, more than two data storage devices 102, 112, or the like. In the depicted embodiment, the first data storage device 102 and the second data storage device 112 are each non-volatile, solid-state storage devices, with a solid-state storage controller 104 and non-volatile, solid-state storage media 110. One or more of the data storage device 102, 112 may include non-volatile, solid-state storage media 110, such as flash memory, nano random access memory ("nano RAM or NRAM"), magneto-resistive RAM ("MRAM"), battery-backed dynamic RAM ("DRAM"), phase change RAM ("PRAM"), etc. Embodiments of the data storage device 102 are described in more detail with respect to FIGS. 2 and 3. In further embodiments, the first data storage device 102 and/or the second data storage device 112 may include other types of non-volatile and/or volatile data storage, such as dynamic RAM ("DRAM"), static RAM ("SRAM"), magnetic data storage, optical data storage, and/or other data storage technologies.

In the depicted embodiment, the first data storage device 102 and the second data storage device 112 are in communication with the ECC module 116. The ECC module 116, in general, coordinates ECC encoding and/or decoding for data stored on, and read from, one or more of the data storage devices 102, 112. The ECC module 116, in various embodiments, may comprise one or more software drivers executing on the host device 114, one or more storage controllers, such as the solid-state storage controllers 104 of the first data storage device 102 and the second data storage device 112, a combination of one or more software drivers and storage controllers, or the like. The ECC module 116 is described in greater detail with regard to FIGS. 5 and 6.

In one embodiment, the ECC module 116 divides ECC decoding capabilities between software executing on the host device 114, such as a software driver, and hardware of the data storage devices 102, 112, such as a hardware embodiment or a hardware portion of the solid-state storage controller 104. The solid-state storage controller 104 may be implemented in hardware/firmware, in software, or in a combination of hardware/firmware and software. Providing error correction and ECC decoding capabilities in both hardware and software, in certain embodiments, gives the ECC module 116 the speed of hardware ECC decoding for bit errors that are expected to occur during normal runtime operation of the data storage devices 102, 112, while still offering the expanded ECC decoding capabilities of software ECC decoders for bit errors that go beyond the normally expected errors, extending the retention time that is possible for stored data.

In embodiments where the ECC module 116 includes a software ECC decoder capable of correcting a greater number of bit errors per ECC chunk than an associated hardware ECC decoder can correct, the hardware size (i.e. the number of gates, size of circuits, etc.) of the associated hardware ECC decoder can be reduced without sacrificing error correcting capabilities. The greater error protection that can be included in a software ECC decoder can also extend the useful life of a data storage device 102, 112, by correcting more bit errors than can easily be corrected in hardware alone. Using both a software ECC decoder and a hardware ECC decoder may also provide greater flexibility, providing the ECC module 116 the option of using the software ECC decoder should the hardware ECC decoder fail, encounter an error, or the like. Using both a software ECC decoder/encoder and a hardware ECC decoder/encoder allows for a flexible error protection management policy that leverages the advantages of hardware encoder/decoders and software encoders/decoders. Advantages such as high speed, maintaining a desired coding rate, and robust error protection can be achieved because the error protection management policy includes adaptable hardware encoders/decoders and software encoders/decoders. Such a flexible error protection management policy may dynamically adapt as storage media becomes more error prone to provide more protection at the most optimal performance level to extend the useful life of the media.

In another embodiment, the ECC module 116 determines one or more ECC characteristics of the data storage devices 102, 112 for encoding and/or decoding data of the data storage devices 102, 112. The ECC module 116, in a further embodiment, configures or adjusts a set of one or more ECC characteristics for the data storage devices 102, 112. An ECC characteristic, in one embodiment, is a definition of one or more aspects of an error correction policy for a data storage device 102, 112 that the ECC module 116 uses to implement the error correction policy.

The ECC module 116, in certain embodiments, supports several different sets of ECC characteristics, with different ECC attributes. For example, the ECC module 116 may simultaneously support different ECC algorithms, different ECC codeword sizes, and the like. The ECC module 116, in various embodiments, may support different sets of ECC characteristics for a single data storage device 102, 112, different sets of ECC characteristics for different data storage devices 102, 112 that are connected to the host device 114, transitioning from one set of ECC characteristics to another on a single data storage device 102, or the like. By supporting multiple unique sets of ECC characteristics, in certain embodiments, the ECC module 116 can simultaneously support data storage devices 102, 112 from different product cycles or different vendors, can adapt ECC characteristics over the lifetime of a data storage device 102, can adapt ECC characteristics as a data storage device 102 changes use cases, and the like. This adaptability can reduce the need for separate device driver versions on a single host device 114 or for upgrading device drivers to support different data storage devices 102. Using a single device driver that includes the ECC module 116 can also reduce processing and memory overhead for the host device 114 over using multiple separate device drivers.

In one embodiment, the ECC module 116 implements a concatenated code, an error correction mechanism that uses two separate codes. In one embodiment, a BCH code may be used for an inner code and a parity code is used for an outer code. For example, an Error Correcting code may be used with data stored on the media and in addition a code such as a parity strip may be used to further protect the data where the data is organized in an array of storage elements. The parity strip can be used to swap in with data for a row of the array of storage elements such that the whole stripe may become recoverable.

The first data storage device 102 and/or the second data storage device 112, in one embodiment, are direct attached storage ("DAS") of the host device 114. DAS, as used herein, is data storage that is connected to a device, either internally or externally, without a storage network in between. In one embodiment, the first data storage device 102 and/or the second data storage device 112 are internal to the host device 114 and are connected using a system bus, such as a peripheral component interconnect express ("PCI-e") bus, a Serial Advanced Technology Attachment ("SATA") bus, or the like. In another embodiment, one or more of the first data storage device 102 and the second data storage device 112 may be external to the host device 114 and may be connected using a universal serial bus ("USB") connection, an Institute of Electrical and Electronics Engineers ("IEEE") 1394 bus ("FireWire"), an external SATA ("eSATA") connection, or the like. In other embodiments, the first data storage device 102, the second data storage device 112, and/or the storage device 118 may be connected to the host device 114 using a peripheral component interconnect ("PCI") express bus using external electrical or optical bus extension or bus networking solution such as Infiniband or PCI Express Advanced Switching ("PCIe-AS"), or the like.

In various embodiments, the first data storage device 102 and/or the second data storage device 112 may be in the form of a dual-inline memory module ("DIMM"), a daughter card, a micro-module, or the like. In another embodiment, the first data storage device 102 and/or the second data storage device 112 may be elements within a rack-mounted blade. In another embodiment, the first data storage device 102 and/or the second data storage device 112 may be contained within packages that are integrated directly onto a higher level assembly (e.g. mother board, lap top, graphics processor). In another embodiment, individual components comprising the first data storage device 102 and/or the second data storage device 112 are integrated directly onto a higher level assembly without intermediate packaging.

In a further embodiment, instead of being connected directly to the host device 114 as DAS, the first data storage device 102 and/or the second data storage device 112 may be connected to the host device 114 over a data network. For example, the first data storage device 102 and/or the second data storage device 112 may include a storage area network ("SAN") storage device, a network attached storage ("NAS") device, a network share, or the like. In one embodiment, the system 100 may include a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host device 114 and one or more of the first data storage device 102, the second data storage device 112, and the storage device 118.

In the depicted embodiment, the first data storage device 102 and the second data storage device 112 each includes one or more solid-state storage controllers 104 with a write data pipeline 106 and a read data pipeline 108 and each includes a solid-state storage media 110, which are described in more detail below with respect to FIGS. 2 and 3.

The system 100 includes the host device 114 which is in communication with the first data storage device 102 and the second data storage device 112, and includes the ECC module 116. A host device 114 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. In another embodiment, a host device 114 may be a client and one or more of the data storage devices 102, 112 operate autonomously to service data requests sent from the host device 114. In this embodiment, the host device 114 and one or more of the data storage devices 102, 112 may be connected using a computer network, system bus, or other communication means suitable for connection between a host device 114 and an autonomous data storage device 102, 112.

In one embodiment, the first data storage device 102 and/or the second data storage device 112 have block device interfaces that support block device commands. For example, one or more of the first data storage device 102 and the second data storage device 112 may support the ATA interface standard, the ATA Packet Interface ("ATAPI") standard, the small computer system interface ("SCSI") standard, and/or the Fibre Channel standard which are maintained by the InterNational Committee for Information Technology Standards ("INCITS").

Solid-State Storage Device

Figure 2:
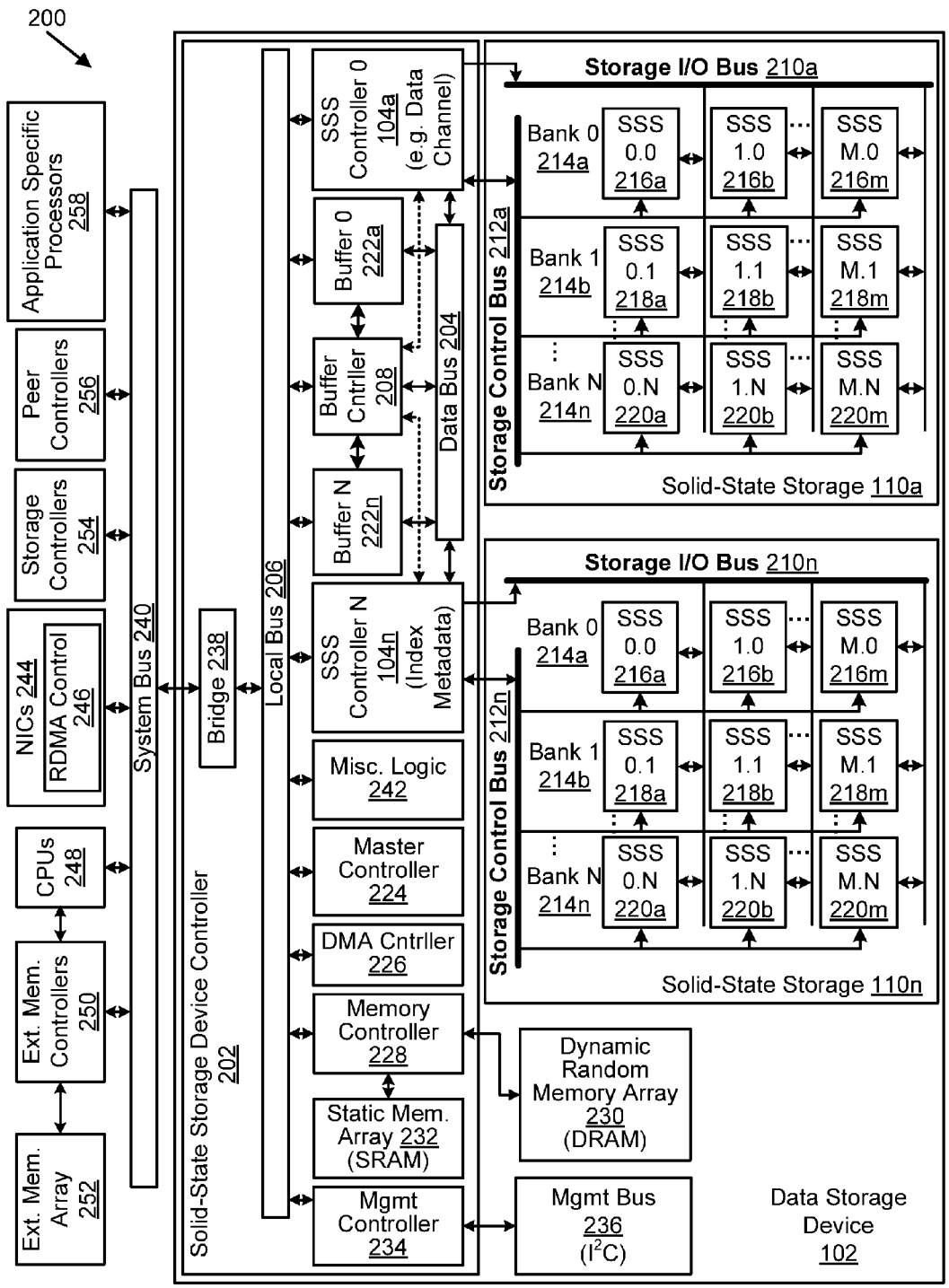
FIG. 2 is a schematic block diagram illustrating one embodiment of a solid-state storage device controller for a data storage device in accordance with the present invention.

FIG. 2 is a schematic block diagram illustrating one embodiment 200 of a solid-state storage device controller 202 that includes a write data pipeline 106 and a read data pipeline 108 in a solid-state storage device 102 in accordance with the present invention. The solid-state storage device controller 202 may include a number of solid-state storage controllers 0-N 104a-n, each controlling solid-state storage 110. In the depicted embodiment, two solid-state controllers are shown: solid-state controller 0 104a and solid-state storage controller N 104n, and each controls solid-state storage 110a-n. In the depicted embodiment, solid-state storage controller 0 104a controls a data channel so that the attached solid-state storage 110a stores data. Solid-state storage controller N 104n controls an index metadata channel associated with the stored data and the associated solid-state storage 110n stores index metadata. In an alternate embodiment, the solid-state storage device controller 202 includes a single solid-state controller 104a with a single solid-state storage 110a. In another embodiment, there are a plurality of solid-state storage controllers 104a-n and associated solid-state storage 110a-n. In one embodiment, one or more solid state controllers 104a-104n-1, coupled to their associated solid-state storage 110a-110n-1, control data while at least one solid-state storage controller 104n, coupled to its associated solid-state storage 110n, controls index metadata.

In one embodiment, at least one solid-state controller 104 is a field-programmable gate array ("FPGA") and controller functions are programmed into the FPGA. In a particular embodiment, the FPGA is a Xilinx® FPGA. In another embodiment, the solid-state storage controller 104 comprises components specifically designed as a solid-state storage controller 104, such as an application-specific integrated circuit ("ASIC") or custom logic solution. Each solid-state storage controller 104 typically includes a write data pipeline 106 and a read data pipeline 108, which are describe further in relation to FIG. 3. In another embodiment, at least one solid-state storage controller 104 is made up of a combination FPGA, ASIC, and custom logic components.

Solid-State Storage

The solid state storage 110 is an array of non-volatile solid-state storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the solid-state storage 110, data cannot be read from the solid-state storage 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A solid-state storage element (e.g. SSS 0.0 216a) is typically configured as a chip (a package of one or more dies) or a die on a circuit board. As depicted, a solid-state storage element (e.g. 216a) operates independently or semi-independently of other solid-state storage elements (e.g. 218a) even if these several elements are packaged together in a chip package, a stack of chip packages, or some other package element. As depicted, a row of solid-state storage elements 216a, 216b, 216m is designated as a bank 214. As depicted, there may be "n" banks 214a-n and "m" solid-state storage elements 216a-m, 218a-m, 220a-m per bank in an array of n×m solid-state storage elements 216, 218, 220 in a solid-state storage 110. Of course different embodiments may include different values for n and m. In one embodiment, a solid-state storage 110a includes twenty solid-state storage elements 216a, 216b, 216m per bank 214 with eight banks 214. In addition to the n×m storage elements 216, 218, 220, one or more additional columns (P) may also be addressed and operated in parallel with other solid-state storage elements 216a, 216b, 216m for one or more rows. The added P columns in one embodiment, store parity data for the portions of an ECC chunk (i.e. an ECC codeword) that span m storage elements for a particular bank. In one embodiment, each solid-state storage element 216, 218, 220 is comprised of a single-level cell ("SLC") devices. In another embodiment, each solid-state storage element 216, 218, 220 is comprised of multi-level cell ("MLC") devices.

In one embodiment, solid-state storage elements that share a common storage I/O bus 210a (e.g. 216b, 218b, 220b) are packaged together. In one embodiment, a solid-state storage element 216, 218, 220 may have one or more dies per chip with one or more chips stacked vertically and each die may be accessed independently. In another embodiment, a solid-state storage element (e.g. SSS 0.0 216a) may have one or more virtual dies per die and one or more dies per chip and one or more chips stacked vertically and each virtual die may be accessed independently. In another embodiment, a solid-state storage element SSS 0.0 216a may have one or more virtual dies per die and one or more dies per chip with some or all of the one or more dies stacked vertically and each virtual die may be accessed independently.

In one embodiment, two dies are stacked vertically with four stacks per group to form eight storage elements (e.g. SSS 0.0-SSS 0.8) 216a-220a, each in a separate bank 214a-n. In another embodiment, 20 storage elements (e.g. SSS 0.0-SSS 20.0) 216 form a logical bank 214a so that each of the eight logical banks has 20 storage elements (e.g. SSS0.0-SSS 20.8) 216, 218, 220. Data is sent to the solid-state storage 110 over the storage I/O bus 210 to all storage elements of a particular group of storage elements (SSS 0.0-SSS 0.8) 216a, 218a, 220a. The storage control bus 212a is used to select a particular bank (e.g. Bank-0 214a) so that the data received over the storage I/O bus 210 connected to all banks 214 is written just to the selected bank 214a.

In a one embodiment, the storage I/O bus 210 is comprised of one or more independent I/O buses ("IIOBa-m" comprising 210a.a-m, 210n.a-m) wherein the solid-state storage elements within each column share one of the independent I/O buses that accesses each solid-state storage element 216, 218, 220 in parallel so that all banks 214 are accessed simultaneously. For example, one channel of the storage I/O bus 210 may access a first solid-state storage element 216a, 218a, 220a of each bank 214a-n simultaneously. A second channel of the storage I/O bus 210 may access a second solid-state storage element 216b, 218b, 220b of each bank 214a-n simultaneously. Each row of solid-state storage element 216a, 216b, 216m is accessed simultaneously. In one embodiment, where solid-state storage elements 216, 218, 220 are multi-level (physically stacked), all physical levels of the solid-state storage elements 216, 218, 220 are accessed simultaneously. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214a-n are independently selected using the storage control bus 212. In one embodiment, a bank 214 is selected using a chip enable or chip select. Where both chip select and chip enable are available, the storage control bus 212 may select one level of a multi-level solid-state storage element 216, 218, 220. In other embodiments, other commands are used by the storage control bus 212 to individually select one level of a multi-level solid-state storage element 216, 218, 220. Solid-state storage elements 216, 218, 220 may also be selected through a combination of control and of address information transmitted on storage I/O bus 210 and the storage control bus 212.

In one embodiment, each solid-state storage element 216, 218, 220 is partitioned into erase blocks and each erase block is partitioned into pages. An erase block on a solid-state storage element 216, 218 220 may be called a physical erase block or "PEB." A typical page is 2000 bytes ("2 kB"). In one example, a solid-state storage element (e.g. SSS 0.0) includes two registers and can program two pages so that a two-register solid-state storage element 216, 218, 220 has a capacity of 4 kB. A bank 214 of 20 solid-state storage elements 216a, 216b, 216m would then have an 80 kB capacity of pages accessed with the same address going out the channels of the storage I/O bus 210.

This group of pages in a bank 214 of solid-state storage elements 216a, 216b, 216m of 80 kB may be called a logical page or virtual page. Similarly, an erase block of each storage element 216a-m of a bank 214a may be grouped to form a logical erase block or a virtual erase block. In one embodiment, an erase block of pages within a solid-state storage element 216, 218, 220 is erased when an erase command is received within a solid-state storage element 216, 218, 220. Whereas the size and number of erase blocks, pages, planes, or other logical and physical divisions within a solid-state storage element 216, 218, 220 are expected to change over time with advancements in technology, it is to be expected that many embodiments consistent with new configurations are possible and are consistent with the general description herein.

Typically, when a packet is written to a particular location within a solid-state storage element 216, 218, 220, wherein the packet is intended to be written to a location within a particular page which is specific to a of a particular physical erase block of a particular storage element of a particular bank, a physical address is sent on the storage I/O bus 210 and followed by the packet. The physical address contains enough information for the solid-state storage element 216, 218, 220 to direct the packet to the designated location within the page. Since all storage elements in a column of storage elements (e.g. SSS 0.0-SSS 0.N 216a, 218a, 220a) are accessed simultaneously by the appropriate bus within the storage I/O bus 210a.a, to reach the proper page and to avoid writing the data packet to similarly addressed pages in the column of storage elements (SSS 0.0-SSS 0.N 216a, 218a, 220a), the bank 214a that includes the solid-state storage element SSS 0.0 216a with the correct page where the data packet is to be written is simultaneously selected by the storage control bus 212.

Similarly, a read command traveling on the storage I/O bus 210 requires a simultaneous command on the storage control bus 212 to select a single bank 214a and the appropriate page within that bank 214a. In one embodiment, a read command reads an entire page, and because there are multiple solid-state storage elements 216a, 216b, 216m in parallel in a bank 214, an entire logical page is read with a read command. However, the read command may be broken into subcommands, as will be explained below with respect to bank interleave. A logical page may also be accessed in a write operation.

An erase block erase command may be sent out to erase an erase block over the storage I/O bus 210 with a particular erase block address to erase a particular erase block. Typically, an erase block erase command may be sent over the parallel paths of the storage I/O bus 210 to erase a logical erase block, each with a particular erase block address to erase a particular erase block. Simultaneously a particular bank (e.g. bank-0 214a) is selected over the storage control bus 212 to prevent erasure of similarly addressed erase blocks in all of the banks (banks 1-N 214b-n). Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, packets are written sequentially to the solid-state storage 110. For example, packets are streamed to the storage write buffers of a bank 214a of storage elements 216 and when the buffers are full, the packets are programmed to a designated logical page. Packets then refill the storage write buffers and, when full, the packets are written to the next logical page. The next logical page may be in the same bank 214a or another bank (e.g. 214b). This process continues, logical page after logical page, typically until a logical erase block is filled. In another embodiment, the streaming may continue across logical erase block boundaries with the process continuing, logical erase block after logical erase block.

In a read, modify, write operation, data packets associated with the object are located and read in a read operation. Data segments of the modified object that have been modified are not written to the location from which they are read. Instead, the modified data segments are again converted to data packets and then written sequentially to the next available location in the logical page currently being written. The object index entries for the respective data packets are modified to point to the packets that contain the modified data segments. The entry or entries in the object index for data packets associated with the same object that have not been modified will include pointers to original location of the unmodified data packets. Thus, if the original object is maintained, for example to maintain a previous version of the object, the original object will have pointers in the object index to all data packets as originally written. The new object will have pointers in the object index to some of the original data packets and pointers to the modified data packets in the logical page that is currently being written.

In a copy operation, the object index includes an entry for the original object mapped to a number of packets stored in the solid-state storage 110. When a copy is made, a new object is created and a new entry is created in the object index mapping the new object to the original packets. The new object is also written to the solid-state storage 110 with its location mapped to the new entry in the object index. The new object packets may be used to identify the packets within the original object that are referenced in case changes have been made in the original object that have not been propagated to the copy and the object index is lost or corrupted.

Beneficially, sequentially writing packets facilitates a more even use of the solid-state storage 110 and allows the solid-storage device controller 202 to monitor storage hot spots and level usage of the various logical pages in the solid-state storage 110. Sequentially writing packets also facilitates a powerful, efficient garbage collection system, which is described in detail below. One of skill in the art will recognize other benefits of sequential storage of data packets.

Solid-State Storage Device Controller

In various embodiments, the solid-state storage device controller 202 also includes a data bus 204, a local bus 206, a buffer controller 208, buffers 0-N 222*a-n*, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the host device 114 or may be other devices.

Typically the solid-state storage controller(s) 104 communicate data to the solid-state storage 110 over a storage I/O bus 210. In a typical embodiment where the solid-state storage is arranged in banks 214 and each bank 214 includes multiple storage elements 216*a*, 216*b*, 216*m* accessed in parallel, the storage I/O bus 210 is an array of busses, one for each column of storage elements 216, 218, 220 spanning the banks 214. As used herein, the term "storage I/O bus" may refer to one storage I/O bus 210 or an array of data independent busses 204. In one embodiment, each storage I/O bus 210 accessing a column of storage elements (e.g. 216*a*, 218*a*, 220*a*) may include a logical-to-physical mapping for storage divisions (e.g. erase blocks) accessed in a column of storage elements 216*a*, 218*a*, 220*a*. This mapping (or bad block remapping) allows a logical address mapped to a physical address of a storage division to be remapped to a different storage division if the first storage division fails, partially fails, is inaccessible, or has some other problem.

Data may also be communicated to the solid-state storage controller(s) 104 from a requesting device 155 through the system bus 240, bridge 238, local bus 206, buffer(s) 222, and finally over a data bus 204. The data bus 204 typically is connected to one or more buffers 222*a-n* controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically the data is transferred from the local bus 206 to one or more data buffers 222 as directed by the master controller 224 and the buffer controller 208. The data then flows out of the buffer(s) 222 to the data bus 204, through a solid-state controller 104, and on to the solid-state storage 110 such as NAND flash or other storage media. In one embodiment, data and associated out-of-band metadata ("object metadata") arriving with the data is communicated using one or more data channels comprising one or more solid-state storage controllers 104*a*-104*n-1* and associated solid-state storage 110*a*-110*n-1* while at least one channel (solid-state storage controller 104*n*, solid-state storage 110*n*) is dedicated to in-band metadata, such as index information and other metadata generated internally to the solid-state storage device 102.

The local bus 206 is typically a bidirectional bus or set of busses that allows for communication of data and commands between devices internal to the solid-state storage device controller 202 and between devices internal to the solid-state storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a host device 114 or other device in which the solid-state storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The solid-state storage device 102 may be packaged to fit internally to a device or as an externally connected device.

The solid-state storage device controller 202 includes a master controller 224 that controls higher-level functions within the solid-state storage device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/solid-state storage device controller 202 manages multiple data storage devices/solid-state storage 110a-n, the master controller 224 divides the work load among internal controllers, such as the solid-state storage controllers 104a-n. For example, the master controller 224 may divide an object to be written to the data storage devices (e.g. solid-state storage 110a-n) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a host device 114 or other device connected to the storage device/solid-state storage device 102 views the storage device/solid-state storage device 102 as a block storage device and sends data to specific physical addresses in the storage device/solid-state storage device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in the host device 114, a client, or other device wishing to use the storage device/solid-state storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a client may have access to a computer network through an I/O memory driver using a standard stack API and operating in conjunction with NICs 244.

In one embodiment, the master controller 224 is also a redundant array of independent drive ("RAID") controller. Where the data storage device/solid-state storage device 102 is networked with one or more other data storage devices/solid-state storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g. switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via a computer network) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/solid-state storage device 102 may appear as a storage device connected through a SCSI bus, Internet SCSI ("iSCSI"), fiber channel, etc. Meanwhile the storage device/solid-state storage device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/solid-state storage device 102 to be partitioned into multiple logical devices and allows partition-based media encryption. In yet another embodiment, the master controller 224 supports a solid-state storage controller 104 with advanced, multi-bit ECC correction. One of skill in the art will recognize other features and functions of a master controller 224 in a storage controller 202, or more specifically in a solid-state storage device 102.

In one embodiment, the solid-state storage device controller 202 includes a memory controller 228 which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the solid-state storage 110n or other non-volatile memory. One of skill in the art will recognize other uses and configurations of the memory controller 228, dynamic memory array 230, and static memory array 232.

In one embodiment, the solid-state storage device controller 202 includes a DMA controller 226 that controls DMA operations between the storage device/solid-state storage device 102 and one or more external memory controllers 250 and associated external memory arrays 252 and CPUs 248. Note that the external memory controllers 250 and external memory arrays 252 are called external because they are external to the storage device/solid-state storage device 102. In addition, the DMA controller 226 may also control RDMA operations with requesting devices through a NIC 244 and associated RDMA controller 246.

In one embodiment, the solid-state storage device controller 202 includes a management controller 234 connected to a management bus 236. Typically, the management controller 234 manages environmental metrics and status of the storage device/solid-state storage device 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically the management bus 236 is connected to the various components within the storage device/solid-state storage device 102. The management controller 234 may communicate alerts, interrupts, etc. over the local bus 206 or may include a separate connection to a system bus 240 or other bus. In one embodiment, the management bus 236 is an Inter-Integrated Circuit ("I2C") bus. One of skill in the art will recognize other related functions and uses of a management controller 234 connected to components of the storage device/solid-state storage device 102 by a management bus 236.

In one embodiment, the solid-state storage device controller 202 includes miscellaneous logic 242 that may be customized for a specific application. Typically, where the solid-state device controller 202 or master controller 224 is/are configured using a FPGA or other configurable controller, custom logic may be included based on a particular application, customer requirement, storage requirement, etc.

Data Pipeline

Figure 3:
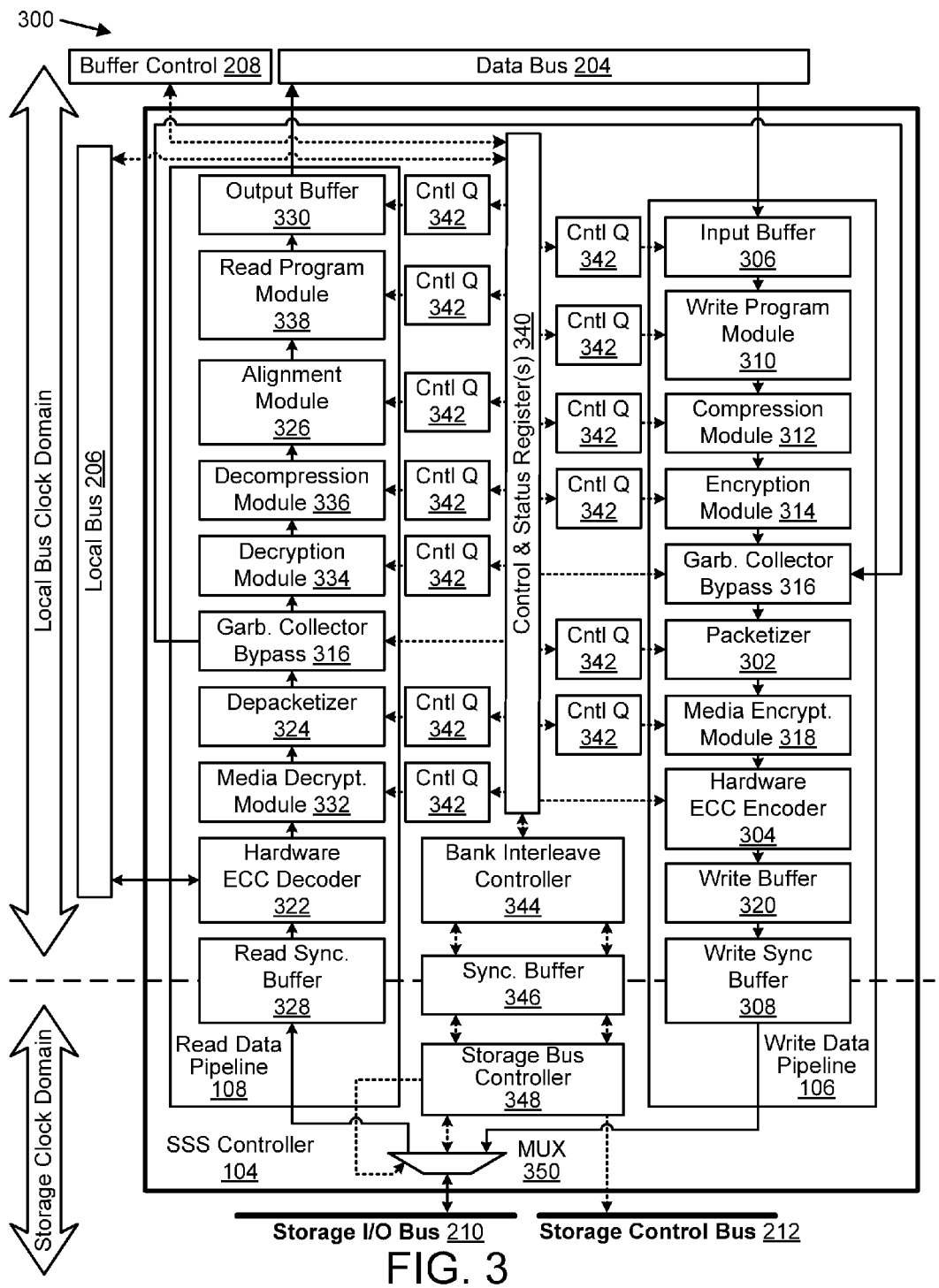
FIG. 3 is a schematic block diagram illustrating one embodiment of a solid-state storage controller with a write data pipeline and a read data pipeline in a data storage device in accordance with the present invention.

FIG. 3 is a schematic block diagram illustrating one embodiment 300 of a solid-state storage controller 104 with a write data pipeline 106 and a read data pipeline 108 in a solid-state storage device 102 in accordance with the present invention. The embodiment 300 includes a data bus 204, a local bus 206, and buffer control 208, which are substantially similar to those described in relation to the solid-state storage device controller 202 of FIG. 2. The write data pipeline 106 includes a packetizer 302 and a hardware ECC encoder 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, a hardware ECC decoder 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The solid-state storage controller 104 may also include control and status registers 340 and control queues 342, a bank interleave controller 344, a synchronization buffer 346, a storage bus controller 348, and a multiplexer ("MUX") 350. The components of the solid-state controller 104 and associated write data pipeline 106 and read data pipeline 108 are described below. In other embodiments, synchronous solid-state storage media 110 may be used and synchronization buffers 308 328 may be eliminated.

As described above with regard to FIGS. 2 and 3, in certain embodiments, the solid-state storage controller 104 may include one or more custom logic components, such as an FPGA, an ASIC, a microcontroller, and/or other custom logic components. One or more hardware components of the solid-state storage controller 104, such as the hardware ECC encoder 304 and/or the hardware ECC decoder 322, in one embodiment, are implemented at least partially in firmware of an FPGA or other programmable logic, in microcode of a controller, and/or in another programmable aspect of a hardware device. As used herein, the term hardware includes firmware, microcode, and other programmable aspects of hardware devices as well as any and all associated physical hardware components.

Write Data Pipeline

The write data pipeline 106, in one embodiment, includes a packetizer 302 that receives a data or metadata segment to be written to the solid-state storage, either directly or indirectly through another write data pipeline 106 stage, and creates one or more packets sized for the solid-state storage media 110. The data or metadata segment is typically part of a data structure such as an object, but may also include an entire data structure. In another embodiment, the data segment is part of a block of data, but may also include an entire block of data. Typically, a set of data such as a data structure is received from a computer, a client, the host device 114, or other computer or device and is transmitted to the solid-state storage device 102 in data segments streamed to the solid-state storage device 102 or host device 114. A data segment may also be known by another name, such as data parcel, but as referenced herein includes all or a portion of a data structure or data block. In a further embodiment, the write data pipeline 106 does not include a packetizer 302, but instead processes data in the form in which the data is received. In another embodiment, the write data pipeline 106 receives data, and the hardware ECC encoder 304 packages the data into ECC codewords without the packetizer 302.

In an embodiment with the packetizer 302, data structures are stored as one or more packets. A data structure may have one or more container packets. A packet may contain a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

In one embodiment, each packet includes a header and possibly data from the data or metadata segment. The header of each packet includes pertinent information to relate the packet to the data structure to which the packet belongs. For example, the header may include an object identifier or other data structure identifier and offset that indicates the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes a hardware ECC encoder 304 that generates one or more error-correcting codes ("ECC") for data in the write data pipeline 106 to be written to the data storage device 102. In a further embodiment, the data includes one or more packets received from the packetizer 302. In one embodiment, the hardware ECC encoder 304 is part of the ECC module 116. In a further embodiment, the hardware ECC encoder 304 is in communication with and/or controlled by the ECC module 116.

The hardware ECC encoder 304 typically uses an error correcting algorithm to generate ECC check bits for data in the write data pipeline 106. The ECC check bits, in one embodiment, are stored with the corresponding data on the data storage device 102 to provide error protection for the corresponding data. In one embodiment, the hardware ECC encoder 304 uses a systematic ECC algorithm that does not change the bits of the data itself, but adds the ECC check bits to the existing data. In a further embodiment, the hardware ECC encoder 304 uses a non-systematic ECC algorithm that adds the ECC check bits to the data by transforming or encoding the data, so that the data is no longer in its original form. A non-systematic ECC algorithm alters the message data bits, while a systematic ECC algorithm does not alter the message data bits.

Examples of ECC algorithms include Bose-Chaudhuri-Hocquenghem ("BCH") codes, Reed-Solomon codes, turbo codes, low-density parity-check ("LDPC") codes, Golay codes, multidimensional parity codes, Hamming codes, and the like. The hardware ECC encoder 304, in one embodiment, is implemented in hardware of the solid-state storage controller 104, such as in logic circuits of an ASIC or other integrated circuit, firmware of an FPGA, microcode of a controller, or the like.

The ECC check bits generated by the hardware ECC encoder 304, together with the corresponding data (or message) associated with the ECC check bits, comprise an ECC chunk, or an ECC codeword. The ECC check bits stored with the message are used to detect and to correct data errors introduced into the message through transmission and storage. A data error, in one embodiment, includes a bit error and/or a symbol error. Some ECC algorithms detect and correct errors at a bit level and other ECC algorithms detect and correct errors at a symbol level. A symbol, in one embodiment, is a grouping of bits.

In one embodiment, packets or other data are streamed into the hardware ECC encoder 304 as un-encoded blocks, or messages, of length K bits. Redundancy bits of length R bits is calculated, appended, and output as an encoded codeword of length N bits=K+R. The R number of ECC bits are used to correct up to T bits (or symbols) in error in the message data of the codeword, in the whole codeword, or the like. The values of N, K, R, and T may depend at least in part upon the characteristics of the ECC algorithm which is selected to achieve specific performance, efficiency, and robustness metrics. In one embodiment, there is no fixed relationship between the ECC blocks and the packets; packets may not be used; the packet may span more than one ECC block; the ECC block may comprise one or more packets; a first packet may end anywhere within the ECC block and a second packet may begin after the end of the first packet within the same ECC block. In one embodiment, the ECC data stored with the message data is robust enough to correct errors in more than two bits.

Beneficially, using a robust ECC algorithm allowing multiple bit correction allows the life of the solid-state storage media 110 to be extended. For example, if flash memory is used as the storage medium in the solid-state storage media 110, the flash memory may be written approximately 100,000 times without too many errors per erase cycle. This usage limit may be extended using a robust ECC algorithm. Having the hardware ECC encoder 304 and corresponding hardware ECC decoder 322 onboard the solid-state storage device 102, the solid-state storage device 102 can internally correct errors and has a longer useful life than if a less robust ECC algorithm is used, such as single bit correction. However, in other embodiments the hardware ECC encoder 304 may use a less robust algorithm and may correct single-bit or double-bit errors. In another embodiment, the solid-state storage device 110 may comprise less reliable storage such as multi-level cell ("MLC") flash in order to increase capacity, which storage may not be sufficiently reliable without more robust ECC algorithms.

In one embodiment, the ECC module 116 adjusts and/or configures a set of one or more ECC characteristics for the hardware ECC encoder 304. As described above with regard to the ECC module 116, in one embodiment, an ECC characteristic includes one or more aspects of an error correction policy for a data storage device 102 that the ECC module 116 uses to implement the error correction policy. In various embodiments, an ECC characteristic that the ECC module 116 may determine and/or set for the hardware ECC encoder 304 may include an ECC algorithm of the hardware ECC encoder 304, an indicator that one or more ECC characteristics of the hardware ECC encoder 304 are reconfigurable, an ECC codeword size N, a message size K, a hardware ECC data error correction capability T of the hardware ECC decoder 322, a hardware ECC data error detection capability of the hardware ECC decoder 322, a software ECC correction capability of the ECC module 116, a software ECC error detection capability of the ECC module 116, and/or other aspects of an error correction policy for the hardware ECC encoder 304. The ECC module 116 is discussed in greater detail with regard to FIG. 6. In one embodiment, the ECC module 116 adjusts a set of ECC characteristics for the hardware ECC encoder 304 by updating firmware of an FPGA or other programmable logic, by updating microcode of a controller, by setting a register value or another stored data value, and/or by using another hardware modification of the hardware ECC encoder 304.

In one embodiment, the write pipeline 106 includes an input buffer 306 that receives a data segment to be written to the solid-state storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically when the write data pipeline 106 does not include an input buffer 306, a buffering function is performed elsewhere, such as in the solid-state storage device 102 but outside the write data pipeline 106, in the host device 114, such as within a network interface card ("NIC"), or at another device, for example when using remote direct memory access ("RDMA").

In another embodiment, the write data pipeline 106 also includes a write synchronization buffer 308 that buffers packets received from the hardware ECC encoder 304 prior to writing the packets to the solid-state storage media 110. The write synch buffer 308 is located at a boundary between a local clock domain and a solid-state storage clock domain and provides buffering to account for the clock domain differences. In other embodiments, synchronous solid-state storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the solid-state storage device 102 prior to sending the packets to the hardware ECC encoder 304. Typically, the entire packet is encrypted, including the headers. In another embodiment, headers are not encrypted. In this document, encryption key is understood to mean a secret encryption key that is managed externally from a solid-state storage controller 104.

The media encryption module 318 and corresponding media decryption module 332 provide a level of security for data stored in the solid-state storage media 110. For example, where data is encrypted with the media encryption module 318, if the solid-state storage media 110 is connected to a different solid-state storage controller 104, solid-state storage device 102, or server, the contents of the solid-state storage media 110 typically could not be read without use of the same encryption key used during the write of the data to the solid-state storage media 110 without significant effort.

In a typical embodiment, the solid-state storage device 102 does not store the encryption key in non-volatile storage and allows no external access to the encryption key. The encryption key is provided to the solid-state storage controller 104 during initialization. The solid-state storage device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a client, a server, a host device 114, a key manager, or other device that manages the encryption key to be used by the solid-state storage controller 104. In another embodiment, the solid-state storage media 110 may have two or more partitions and the solid-state storage controller 104 behaves as though it was two or more solid-state storage controllers 104, each operating on a single partition within the solid-state storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior to sending the data segment to the packetizer 302, the data segment encrypted using an encryption key received in conjunction with the data segment. The encryption keys used by the encryption module 314 to encrypt data may not be common to all data stored within the solid-state storage device 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The solid-sate storage device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a client, a host device 114, key manager, or other device that holds the encryption key to be used to encrypt the data segment. In one embodiment, encryption keys are transferred to the solid-state storage controller 104 from one of a solid-state storage device 102, host device 114, client, or other external agent which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the solid-state storage device 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the solid-state storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the solid-state storage media 110. For example, where data is encrypted with media encryption unique to the specific solid-state storage device 102, if the solid-state storage media 110 is connected to a different solid-state storage controller 104, solid-state storage device 102, or host device 114, the contents of the solid-state storage media 110 typically could not be read without use of the same encryption key used during the write of the data to the solid-state storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the solid-state storage device 102 is beneficial so that clients, the host device 114, or other devices writing data to the solid-state storage device 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system typically marks packets that are no longer valid, typically because the packet is marked for deletion or has been modified and the modified data is stored in a different location. At some point, the garbage collection system determines that a particular section of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the solid-state storage controller 104. In one embodiment, the garbage collector bypass 316 is part of an autonomous garbage collector system that operates within the solid-state storage device 102. This allows the solid-state storage device 102 to manage data so that data is systematically spread throughout the solid-state storage media 110 to improve performance, data reliability and to avoid overuse and underuse of any one location or area of the solid-state storage media 110 and to lengthen the useful life of the solid-state storage media 110.

The garbage collector bypass 316 coordinates insertion of segments into the write data pipeline 106 with other segments being written by clients, the host device 114, or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the virtual page in order to improve the efficiency of storage within the solid-state storage media 110 and thereby reduce the frequency of garbage collection.

In one embodiment, the write data pipeline 106 includes a write buffer 320 that buffers data for efficient write operations. Typically, the write buffer 320 includes enough capacity for packets to fill at least one virtual page in the solid-state storage media 110. This allows a write operation to send an entire page of data to the solid-state storage media 110 without interruption. By sizing the write buffer 320 of the write data pipeline 106 and buffers within the read data pipeline 108 to be the same capacity or larger than a storage write buffer within the solid-state storage media 110, writing and reading data is more efficient since a single write command may be crafted to send a full virtual page of data to the solid-state storage media 110 instead of multiple commands.

While the write buffer 320 is being filled, the solid-state storage media 110 may be used for other read operations. This is advantageous because other solid-state devices with a smaller write buffer or no write buffer may tie up the solid-state storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again, this is inefficient because multiple write/program cycles are required to fill a page.

For depicted embodiment with a write buffer 320 sized larger than a virtual page, a single write command, which includes numerous subcommands, can then be followed by a single program command to transfer the page of data from the storage write buffer in each solid-state storage element 216, 218, 220 to the designated page within each solid-state storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a virtual page of data segments. One of skill in the art will recognize other write buffer 320 configurations that allow a virtual page of data to be stored prior to writing the data to the solid-state storage media 110.

In another embodiment, the write buffer 320 is sized smaller than a virtual page so that less than a page of information could be written to a storage write buffer in the solid-state storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the solid-state storage media 110 to fill the pages of a virtual page prior to programming the data. In this way, a data stall in the write data pipeline 106 would not stall reading from the solid-state storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the solid-state storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

Read Data Pipeline

The read data pipeline 108 includes a hardware ECC decoder 322 that determines if data errors exist in ECC codewords received from the solid-state storage media 110 by using ECC data stored with each ECC codeword. In one embodiment, an ECC codeword corresponds to one or more requested packets. The hardware ECC decoder 322 corrects errors in one or more ECC codewords if any errors exist and the errors are correctable using the ECC data.

For example, if the ECC algorithm and level of ECC protection used can detect an error in six bits but can only correct three bit errors (i.e. T=3), the hardware ECC decoder 322 corrects ECC blocks of the requested packet with up to three bits in error. The hardware ECC decoder 322 corrects the bits (or other symbols) in error by changing the bits in error to the correct one or zero state so that the requested data packet is identical to when it was written to the solid-state storage media 110 and the ECC data was generated for the packet or packets. In another embodiment, the hardware ECC decoder 322 is configured with a maximum hardware correction threshold that is less than or equal to T, the number of data errors that are correctable using a selected ECC algorithm and level of ECC protection. The hardware ECC decoder 322, in a further embodiment, has a hardware correction threshold that is configurable by the ECC module 116, and can be set up to the maximum hardware correction threshold.

If the hardware ECC decoder 322 determines that the requested ECC codeword contains more bits in error than the hardware ECC decoder 322 can correct using ECC data for the ECC codeword, the hardware ECC decoder 322 cannot correct the errors of the requested ECC codeword and sends an interrupt, or the like. In one embodiment, the hardware ECC decoder 322 sends an interrupt to the ECC module 116 with a message indicating that the requested ECC codeword is in error. The message may include information that the hardware ECC decoder 322 cannot correct the errors or the inability of the hardware ECC decoder 322 to correct the errors may be implied. In another embodiment, the hardware ECC decoder 322 sends one or more corrupted ECC codewords with the interrupt and/or the message.

In one embodiment, a corrupted ECC codeword or portion of a corrupted ECC codeword that cannot be corrected by the hardware ECC decoder 322 (i.e. a number of errors in the ECC codeword exceeds the hardware correction threshold) is read by the master controller 224 and/or the ECC correction module 116, corrected if possible, and returned to the hardware ECC decoder 322 for further processing by the read data pipeline 108. In one embodiment, a corrupted ECC codeword or portion of a corrupted ECC codeword is sent to the device requesting the data. The requesting device 155 may correct the ECC codeword or replace the data using another copy, such as a backup or mirror copy, and then may use the replacement data or return it to the read data pipeline 108. The requesting device 155 may use header information associated with the data in error to identify data required to replace the corrupted ECC codeword or to replace the data structure to which the ECC codeword belongs. In another embodiment, the solid-state storage controller 104 stores data using some type of RAID and is able to recover the corrupted data. In another embodiment, the hardware ECC decoder 322 sends an interrupt and/or message and the receiving device fails the read operation associated with the requested ECC codeword. One of skill in the art will recognize other options and actions to be taken as a result of the hardware ECC decoder 322 determining that one or more ECC codewords are corrupted and that the hardware ECC decoder 322 cannot correct the errors.

In one embodiment, the ECC module 116 corrects one or more errors in an ECC codeword using a software ECC decoder. The ECC module 116 uses a software ECC decoder to validate an ECC codeword when the ECC codeword satisfies a correction threshold, such as a software correction threshold, a hardware correction threshold, or the like. In one embodiment, the hardware ECC decoder 322 includes hardware capabilities to correct data errors up to a maximum hardware correction threshold, and the ECC module 116 corrects data errors greater than the maximum hardware correction threshold, or greater than a hardware correction threshold that is less than or equal to the maximum hardware correction threshold. For example, the hardware ECC decoder 322, in one embodiment, corrects errors in ECC codewords with 0-4 data errors, and the software ECC decoder of the ECC module 116 corrects errors in ECC codewords with 5-39 data errors, or the like.

In a further embodiment, ranges associated with a hardware correction threshold of the hardware ECC decoder 322 and the software decoder of the ECC module 116 overlap, and either may correct data errors in certain ECC codewords. For example, in one embodiment, the hardware ECC decoder 322 corrects errors in ECC codewords with 0-4 data errors, and the software ECC decoder of the ECC module 116 corrects errors in ECC codewords with 2-39 data errors. For ECC codewords in the overlapping range, the ECC module 116 and/or the hardware ECC decoder 322 may assign the ECC codewords to either the hardware ECC decoder 322 or the software ECC decoder of the ECC module 116 based on, in various embodiments, a current load of the data storage device 102, a current state of the hardware ECC decoder 322, or the like.

In another embodiment, a software ECC decoder, (in one embodiment the ECC module 116), and the hardware ECC decoder 322 cooperate to correct errors, the hardware ECC decoder 322 correcting a portion of errors in an ECC codeword and the software ECC decoder of the ECC module 116 correcting an additional portion of errors in the ECC codeword. In one embodiment, depending on the ECC algorithm used, data errors in a codeword may have a detectable order, allowing the hardware ECC decoder 322 to detect and correct a first set of data errors, and the software decoder of the ECC module 116 to skip or pass over the first set of data errors to correct a second set of data errors.

In a further embodiment, a software ECC decoder corrects each data error in an ECC codeword with a greater number of data errors than the hardware correction threshold. In one embodiment, the hardware ECC decoder 322 detects how many data bit errors are in an ECC codeword, and sends the ECC codeword to the ECC module 116 for correction in response to the number of detected data errors satisfying a software correction threshold. In one embodiment, the ECC module 116 may dynamically set the hardware correction threshold to various levels between zero data errors and the maximum hardware correction threshold.

As described above with regard to the hardware ECC encoder 304, the ECC module 116, in one embodiment, determines, adjusts, or configures a set of one or more ECC characteristics for the hardware ECC decoder 322. An ECC characteristic, in one embodiment, is a definition of, or a value setting for, one or more aspects of an error correction policy for a data storage device 102, 112 that the ECC module 116 uses to implement the error correction policy. In various embodiments, an ECC characteristic that the ECC module 116 may determine and/or set for the hardware ECC decoder 322 may include an ECC algorithm of the hardware ECC decoder 322, an indicator that an ECC characteristic of the hardware ECC decoder 322 is reconfigurable, an ECC codeword size N, a message size K, a hardware ECC correction capability T of the hardware ECC decoder 322, a hardware ECC error detection capability of the hardware ECC decoder 322, a software ECC correction capability of the ECC module 116, a software ECC error detection capability of the ECC module 116, and/or other aspects of an ECC policy for the hardware ECC decoder 322. In one embodiment, the ECC module 116 adjusts a set of ECC characteristics for the hardware ECC decoder 322 by updating firmware of an FPGA or other programmable logic, by updating microcode of a controller, by setting a register value or another stored data value, and/or by using another hardware modification of the hardware ECC encoder 304. The ECC module 116 is discussed in greater detail with regard to FIG. 6.

In one embodiment, the read data pipeline 108 includes a depacketizer 324 that receives one or more ECC codewords of a requested packet from the hardware ECC decoder 322, directly or indirectly. In a further embodiment, data on the data storage device 102 is not organized in packets, or is organized into different data structures, and the read data pipeline 108 does not include a depacketizer 324.

The depacketizer 324, in one embodiment, checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324, in one embodiment, may be directed to not operate on certain packets but to pass these packets forward without modification. One example is a container label that is requested during the course of a rebuild process where the header information is required for index reconstruction. Further examples include the transfer of packets of various types destined for use within the solid-state storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the solid-state storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the solid-state storage media 110 prior to processing by the read data pipeline 108. The read synchronization buffer 328 is at the boundary between the solid-state storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the solid-state storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the hardware ECC decoder 322 and decrypts the one or more requested packets using the encryption key unique to the solid-state storage device 102 prior to sending the one or more requested packets to the depacketizer 324. Typically, the encryption key used to decrypt data by the media decryption module 332 is identical to the encryption key used by the media encryption module 318. In another embodiment, the solid-state storage media 110 may have two or more partitions and the solid-state storage controller 104 behaves as though it was two or more solid-state storage controllers 104 each operating on a single partition within the solid-state storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a client, the host device 114, key manager, or other device that manages the encryption key to be used by the solid-state storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The solid-state storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the hardware ECC encoder 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

Figure 4:
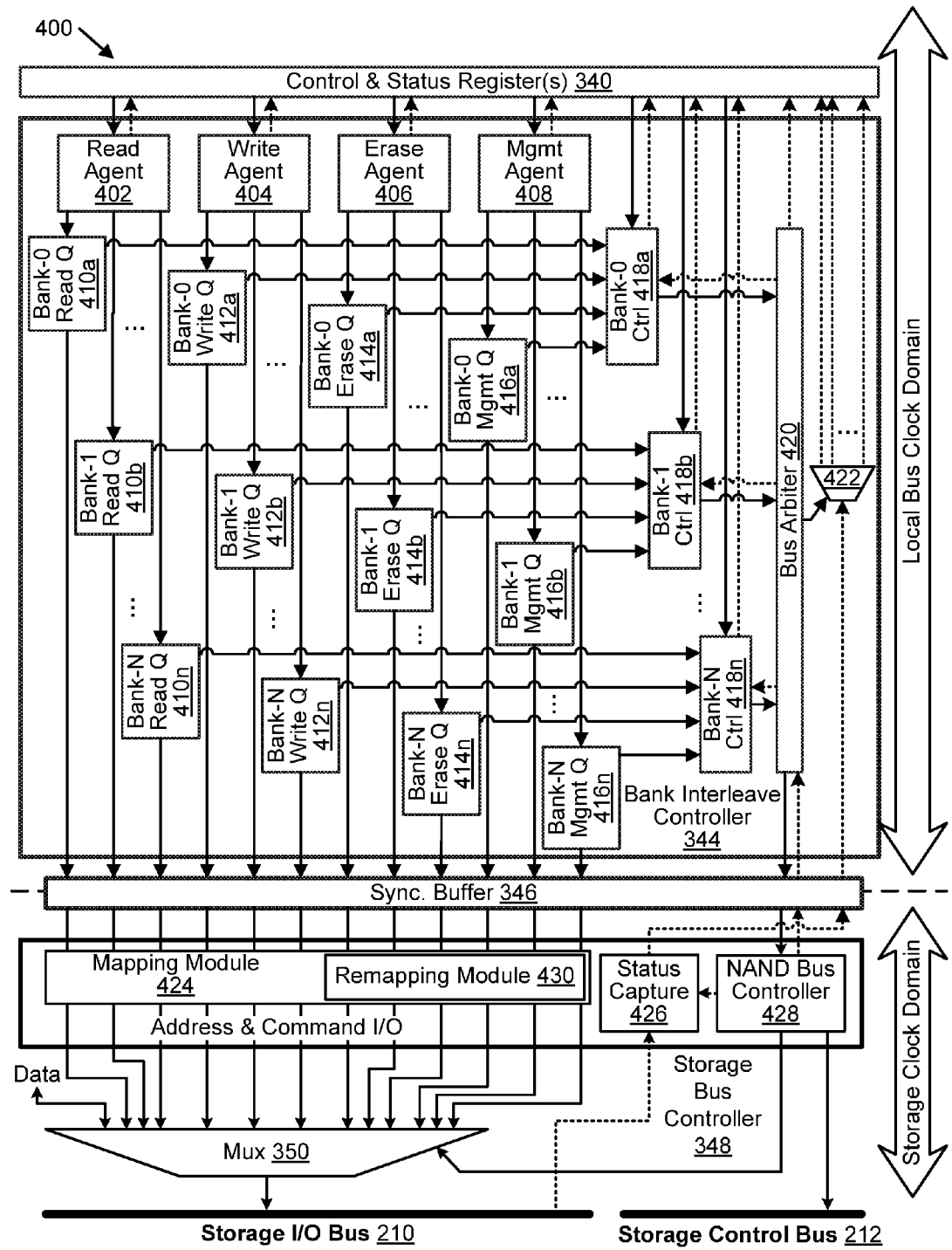
FIG. 4 is a schematic block diagram illustrating one embodiment of a bank interleave controller in a solid-state storage controller in accordance with the present invention.

The solid-state storage controller 104 and or solid-state storage device 102 may also include a bank interleave controller 344, a synchronization buffer 346, a storage bus controller 348, and a multiplexer ("MUX") 350, which are described in relation to FIG. 4.

Bank Interleave

FIG. 4 is a schematic block diagram illustrating one embodiment 400 of a bank interleave controller 344 in the solid-state storage controller 104 in accordance with the present invention. The bank interleave controller 344 is connected to the control and status registers 340 and to the storage I/O bus 210 and storage control bus 212 through the MUX 350, storage bus controller 348, and synchronization buffer 346, which are described below. The bank interleave controller 344 includes a read agent 402, a write agent 404, an erase agent 406, a management agent 408, read queues 410a-n, write queues 412a-n, erase queues 414a-n, and management queues 416a-n for the banks 214 in the solid-state storage media 110, bank controllers 418a-n, a bus arbiter 420, and a status MUX 422, which are described below. The storage bus controller 348 includes a mapping module 424 with a remapping module 430, a status capture module 426, and a NAND bus controller 428, which are described below.

The bank interleave controller 344 directs one or more commands to two or more queues in the bank interleave controller 104 and coordinates among the banks 214 of the solid-state storage media 110 execution of the commands stored in the queues, such that a command of a first type executes on one bank 214a while a command of a second type executes on a second bank 214b. The one or more commands are separated by command type into the queues. Each bank 214 of the solid-state storage media 110 has a corresponding set of queues within the bank interleave controller 344 and each set of queues includes a queue for each command type.

The bank interleave controller 344 coordinates among the banks 214 of the solid-state storage media 110 execution of the commands stored in the queues. For example, a command of a first type executes on one bank 214a while a command of a second type executes on a second bank 214b. Typically, the command types and queue types include read and write commands and queues 410, 412, but may also include other commands and queues that are storage media specific. For example, in the embodiment depicted in FIG. 4, erase and management queues 414, 416 are included and would be appropriate for flash memory, NRAM, MRAM, DRAM, PRAM, etc.

For other types of solid-state storage media 110, other types of commands and corresponding queues may be included without straying from the scope of the invention. The flexible nature of an FPGA solid-state storage controller 104 allows flexibility in storage media. If flash memory were changed to another solid-state storage type, the bank interleave controller 344, storage bus controller 348, and MUX 350 could be altered to accommodate the media type without significantly affecting the data pipelines 106, 108 and other solid-state storage controller 104 functions.

In the embodiment depicted in FIG. 4, the bank interleave controller 344 includes, for each bank 214, a read queue 410 for reading data from the solid-state storage media 110, a write queue 412 for write commands to the solid-state storage media 110, an erase queue 414 for erasing an erase block in the solid-state storage, an a management queue 416 for management commands. The bank interleave controller 344 also includes corresponding read, write, erase, and management agents 402, 404, 406, 408. In another embodiment, the control and status registers 340 and control queues 342 or similar components queue commands for data sent to the banks 214 of the solid-state storage media 110 without a bank interleave controller 344.

The agents 402, 404, 406, 408, in one embodiment, direct commands of the appropriate type destined for a particular bank 214a to the correct queue for the bank 214a. For example, the read agent 402 may receive a read command for bank-1 214*b* and directs the read command to the bank-1 read queue 410*b*. The write agent 404 may receive a write command to write data to a location in bank-0 214*a* of the solid-state storage media 110 and will then send the write command to the bank-0 write queue 412*a*. Similarly, the erase agent 406 may receive an erase command to erase an erase block in bank-1 214*b* and will then pass the erase command to the bank-1 erase queue 414*b*. The management agent 408 typically receives management commands, status requests, and the like, such as a reset command or a request to read a configuration register of a bank 214, such as bank-0 214*a*. The management agent 408 sends the management command to the bank-0 management queue 416*a*.

The agents 402, 404, 406, 408 typically also monitor status of the queues 410, 412, 414, 416 and send status, interrupt, or other messages when the queues 410, 412, 414, 416 are full, nearly full, non-functional, etc. In one embodiment, the agents 402, 404, 406, 408 receive commands and generate corresponding sub-commands. In one embodiment, the agents 402, 404, 406, 408 receive commands through the control & status registers 340 and generate corresponding sub-commands which are forwarded to the queues 410, 412, 414, 416. One of skill in the art will recognize other functions of the agents 402, 404, 406, 408.

The queues 410, 412, 414, 416 typically receive commands and store the commands until required to be sent to the solid-state storage banks 214. In a typical embodiment, the queues 410, 412, 414, 416 are first-in, first-out ("FIFO") registers or a similar component that operates as a FIFO. In another embodiment, the queues 410, 412, 414, 416 store commands in an order that matches data, order of importance, or other criteria.

The bank controllers 418 typically receive commands from the queues 410, 412, 414, 416 and generate appropriate sub-commands. For example, the bank-0 write queue 412*a* may receive a command to write a page of data packets to bank-0 214*a*. The bank-0 controller 418*a* may receive the write command at an appropriate time and may generate one or more write subcommands for each data packet stored in the write buffer 320 to be written to the page in bank-0 214*a*. For example, bank-0 controller 418*a* may generate commands to validate the status of bank 0 214*a* and the solid-state storage array 216, select the appropriate location for writing one or more data packets, clear the input buffers within the solid-state storage memory array 216, transfer the one or more data packets to the input buffers, program the input buffers into the selected location, verify that the data was correctly programmed, and if program failures occur do one or more of interrupting the master controller 224, retrying the write to the same physical location, and retrying the write to a different physical location. Additionally, in conjunction with example write command, the storage bus controller 348 will cause the one or more commands to multiplied to each of the each of the storage I/O buses 210*a*-*n* with the logical address of the command mapped to a first physical addresses for storage I/O bus 210*a*, and mapped to a second physical address for storage I/O bus 210*b*, and so forth as further described below.

Typically, bus arbiter 420 selects from among the bank controllers 418 and pulls subcommands from output queues within the bank controllers 418 and forwards these to the Storage Bus Controller 348 in a sequence that optimizes the performance of the banks 214. In another embodiment, the bus arbiter 420 may respond to a high level interrupt and modify the normal selection criteria. In another embodiment, the master controller 224 can control the bus arbiter 420 through the control and status registers 340. One of skill in the art will recognize other means by which the bus arbiter 420 may control and interleave the sequence of commands from the bank controllers 418 to the solid-state storage media 110.

The bus arbiter 420 typically coordinates selection of appropriate commands, and corresponding data when required for the command type, from the bank controllers 418 and sends the commands and data to the storage bus controller 348. The bus arbiter 420 typically also sends commands to the storage control bus 212 to select the appropriate bank 214. For the case of flash memory or other solid-state storage media 110 with an asynchronous, bi-directional serial storage I/O bus 210, only one command (control information) or set of data can be transmitted at a time. For example, when write commands or data are being transmitted to the solid-state storage media 110 on the storage I/O bus 210, read commands, data being read, erase commands, management commands, or other status commands cannot be transmitted on the storage I/O bus 210. For example, when data is being read from the storage I/O bus 210, data cannot be written to the solid-state storage media 110.

For example, during a write operation on bank-0 the bus arbiter 420 selects the bank-0 controller 418*a* which may have a write command or a series of write sub-commands on the top of its queue which cause the storage bus controller 348 to execute the following sequence. The bus arbiter 420 forwards the write command to the storage bus controller 348, which sets up a write command by selecting bank-0 214*a* through the storage control bus 212, sending a command to clear the input buffers of the solid-state storage elements 110 associated with the bank-0 214*a*, and sending a command to validate the status of the solid-state storage elements 216, 218, 220 associated with the bank-0 214*a*. The storage bus controller 348 then transmits a write subcommand on the storage I/O bus 210, which contains the physical addresses including the address of the logical erase block for each individual physical erase solid-stage storage element 216*a*-*m* as mapped from the logical erase block address. The storage bus controller 348 then muxes the write buffer 320 through the write sync buffer 308 to the storage I/O bus 210 through the MUX 350 and streams write data to the appropriate page. When the page is full, then storage bus controller 348 causes the solid-state storage elements 216*a*-*m* associated with the bank-0 214*a* to program the input buffer to the memory cells within the solid-state storage elements 216*a*-*m*. Finally, the storage bus controller 348 validates the status to ensure that page was correctly programmed.

A read operation is similar to the write example above. During a read operation, typically the bus arbiter 420, or other component of the bank interleave controller 344, receives data and corresponding status information and sends the data to the read data pipeline 108 while sending the status information on to the control and status registers 340. Typically, a read data command forwarded from bus arbiter 420 to the storage bus controller 348 will cause the MUX 350 to gate the read data on storage I/O bus 210 to the read data pipeline 108 and send status information to the appropriate control and status registers 340 through the status MUX 422.

The bus arbiter 420 coordinates the various command types and data access modes so that only an appropriate command type or corresponding data is on the bus at any given time. If the bus arbiter 420 has selected a write command, and write subcommands and corresponding data are being written to the solid-state storage media 110, the bus arbiter 420 will not allow other command types on the storage I/O bus 210. Beneficially, the bus arbiter 420 uses timing information, such as predicted command execution times, along with status information received concerning bank 214 status to coordinate execution of the various commands on the bus with the goal of minimizing or eliminating idle time of the busses.

The master controller 224 through the bus arbiter 420 typically uses expected completion times of the commands stored in the queues 410, 412, 414, 416, along with status information, so that when the subcommands associated with a command are executing on one bank 214a, other subcommands of other commands are executing on other banks 214b-n. When one command is fully executed on a bank 214a, the bus arbiter 420 directs another command to the bank 214a. The bus arbiter 420 may also coordinate commands stored in the queues 410, 412, 414, 416 with other commands that are not stored in the queues 410, 412, 414, 416.

For example, an erase command may be sent out to erase a group of erase blocks within the solid-state storage media 110. An erase command may take 10 to 1000 times more time to execute than a write or a read command or 10 to 100 times more time to execute than a program command. For N banks 214, the bank interleave controller 344 may split the erase command into N commands, each to erase a virtual erase block of a bank 214a. While bank-0 214a is executing an erase command, the bus arbiter 420 may select other commands for execution on the other banks 214b-n. The bus arbiter 420 may also work with other components, such as the storage bus controller 348, the master controller 224, etc., to coordinate command execution among the buses. Coordinating execution of commands using the bus arbiter 420, bank controllers 418, queues 410, 412, 414, 416, and agents 402, 404, 406, 408 of the bank interleave controller 344 can dramatically increase performance over other solid-state storage systems without a bank interleave function.

In one embodiment, the solid-state controller 104 includes one bank interleave controller 344 that serves all of the storage elements 216, 218, 220 of the solid-state storage media 110. In another embodiment, the solid-state controller 104 includes a bank interleave controller 344 for each column of storage elements 216a-m, 218a-m, 220a-m. For example, one bank interleave controller 344 serves one column of storage elements SSS 0.0-SSS M.0 216a, 216b, . . . 216m, a second bank interleave controller 344 serves a second column of storage elements SSS 0.1-SSS M.1 218a, 218b, . . . 218m etc.

Storage-Specific Components

The solid-state storage controller 104 includes a synchronization buffer 346 that buffers commands and status messages sent and received from the solid-state storage media 110. The synchronization buffer 346 is located at the boundary between the solid-state storage clock domain and the local bus clock domain and provides buffering to account for the clock domain differences. The synchronization buffer 346, write synchronization buffer 308, and read synchronization buffer 328 may be independent or may act together to buffer data, commands, status messages, etc. In one embodiment, the synchronization buffer 346 is located where there are the fewest number of signals crossing the clock domains. One skilled in the art will recognize that synchronization between clock domains may be arbitrarily moved to other locations within the solid-state storage device 102 in order to optimize some aspect of design implementation.

The solid-state storage controller 104 includes a storage bus controller 348 that interprets and translates commands for data sent to and read from the solid-state storage media 110 and status messages received from the solid-state storage media 110 based on the type of solid-state storage media 110. For example, the storage bus controller 348 may have different timing requirements for different types of storage, storage with different performance characteristics, storage from different manufacturers, etc. The storage bus controller 348 also sends control commands to the storage control bus 212.

In one embodiment, the solid-state storage controller 104 includes a MUX 350 that comprises an array of multiplexers 350a-n where each multiplexer is dedicated to a row in the solid-state storage array 110. For example, multiplexer 350a is associated with solid-state storage elements 216a, 218a, 220a. MUX 350 routes the data from the write data pipeline 106 and commands from the storage bus controller 348 to the solid-state storage media 110 via the storage I/O bus 210 and routes data and status messages from the solid-state storage media 110 via the storage I/O bus 210 to the read data pipeline 108 and the control and status registers 340 through the storage bus controller 348, synchronization buffer 346, and bank interleave controller 344.

In one embodiment, the solid-state storage controller 104 includes a MUX 350 for each row of solid-state storage elements (e.g. SSS 0.1 216a, SSS 0.2 218a, SSS 0.N 220a). A MUX 350 combines data from the write data pipeline 106 and commands sent to the solid-state storage media 110 via the storage I/O bus 210 and separates data to be processed by the read data pipeline 108 from commands. Packets stored in the write buffer 320 are directed on busses out of the write buffer 320 through a write synchronization buffer 308 for each row of solid-state storage elements (SSS x.0 to SSS x.N 216, 218, 220) to the MUX 350 for each row of solid-state storage elements (SSS x.0 to SSS x.N 216, 218, 220). The commands and read data are received by the MUXes 350 from the storage I/O bus 210. The MUXes 350 also direct status messages to the storage bus controller 348.

The storage bus controller 348 includes a mapping module 424. The mapping module 424 maps a logical address of an erase block to one or more physical addresses of an erase block. For example, a solid-state storage media 110 with an array of twenty storage elements (e.g. SSS 0.0 to SSS M.0 216) per block 214a may have a logical address for a particular erase block mapped to twenty physical addresses of the erase block, one physical address per storage element. Because the storage elements are accessed in parallel, erase blocks at the same position in each storage element in a row of storage elements 216a, 218a, 220a will share a physical address. To select one erase block (e.g. in storage element SSS 0.0 216a) instead of all erase blocks in the row (e.g. in storage elements SSS 0.0, 0.1, . . . 0.N 216a, 218a, 220a), one bank (in this case bank-0 214a) is selected.

This logical-to-physical mapping for erase blocks is beneficial because if one erase block becomes damaged or inaccessible, the mapping can be changed to map to another erase block. This mitigates the loss of losing an entire virtual erase block when one element's erase block is faulty. The remapping module 430 changes a mapping of a logical address of an erase block to one or more physical addresses of a virtual erase block (spread over the array of storage elements). For example, virtual erase block 1 may be mapped to erase block 1 of storage element SSS 0.0 216a, to erase block 1 of storage element SSS 1.0 216b, . . . , and to storage element M.0 216m, virtual erase block 2 may be mapped to erase block 2 of storage element SSS 0.1 218a, to erase block 2 of storage element SSS 1.1 218b, . . . , and to storage element M.1 218m, etc. Alternatively, virtual erase block 1 may be mapped to one erase block from each storage element in an array such that virtual erase block 1 includes erase block 1 of storage element SSS 0.0 216a to erase block 1 of storage element SSS 1.0 216b to storage element M.0 216m, and erase block 1 of storage element SSS 0.1 218a to erase block 1 of storage element SSS 1.1 218*b*, . . . , and to storage element M.1 218*m*, for each storage element in the array up to erase block 1 of storage element M.N 220*m*.

If erase block 1 of a storage element SSS0.0 216*a* is damaged, experiencing errors due to wear, etc., or cannot be used for some reason, the remapping module 430 could change the logical-to-physical mapping for the logical address that pointed to erase block 1 of virtual erase block 1. If a spare erase block (call it erase block 221) of storage element SSS 0.0 216*a* is available and currently not mapped, the remapping module 430 could change the mapping of virtual erase block 1 to point to erase block 221 of storage element SSS 0.0 216*a*, while continuing to point to erase block 1 of storage element SSS 1.0 216*b*, erase block 1 of storage element SSS 2.0 (not shown) . . . , and to storage element M.0 216*m*. The mapping module 424 or remapping module 430 could map erase blocks in a prescribed order (virtual erase block 1 to erase block 1 of the storage elements, virtual erase block 2 to erase block 2 of the storage elements, etc.) or may map erase blocks of the storage elements 216, 218, 220 in another order based on some other criteria.

In one embodiment, the erase blocks could be grouped by access time. Grouping by access time, meaning time to execute a command, such as programming (writing) data into pages of specific erase blocks, can level command completion so that a command executed across the erase blocks of a virtual erase block is not limited by the slowest erase block. In other embodiments, the erase blocks may be grouped by wear level, health, etc. One of skill in the art will recognize other factors to consider when mapping or remapping erase blocks.

In one embodiment, the storage bus controller 348 includes a status capture module 426 that receives status messages from the solid-state storage media 110 and sends the status messages to the status MUX 422. In another embodiment, when the solid-state storage media 110 is flash memory, the storage bus controller 348 includes a NAND bus controller 428. The NAND bus controller 428 directs commands from the read and write data pipelines 106, 108 to the correct location in the solid-state storage media 110, 023 coordinates timing of command execution based on characteristics of the flash memory, etc. If the solid-state storage media 110 is another solid-state storage type, the NAND bus controller 428 would be replaced by a bus controller specific to the storage type. One of skill in the art will recognize other functions of a NAND bus controller 428.

Error Correction

Figure 5:
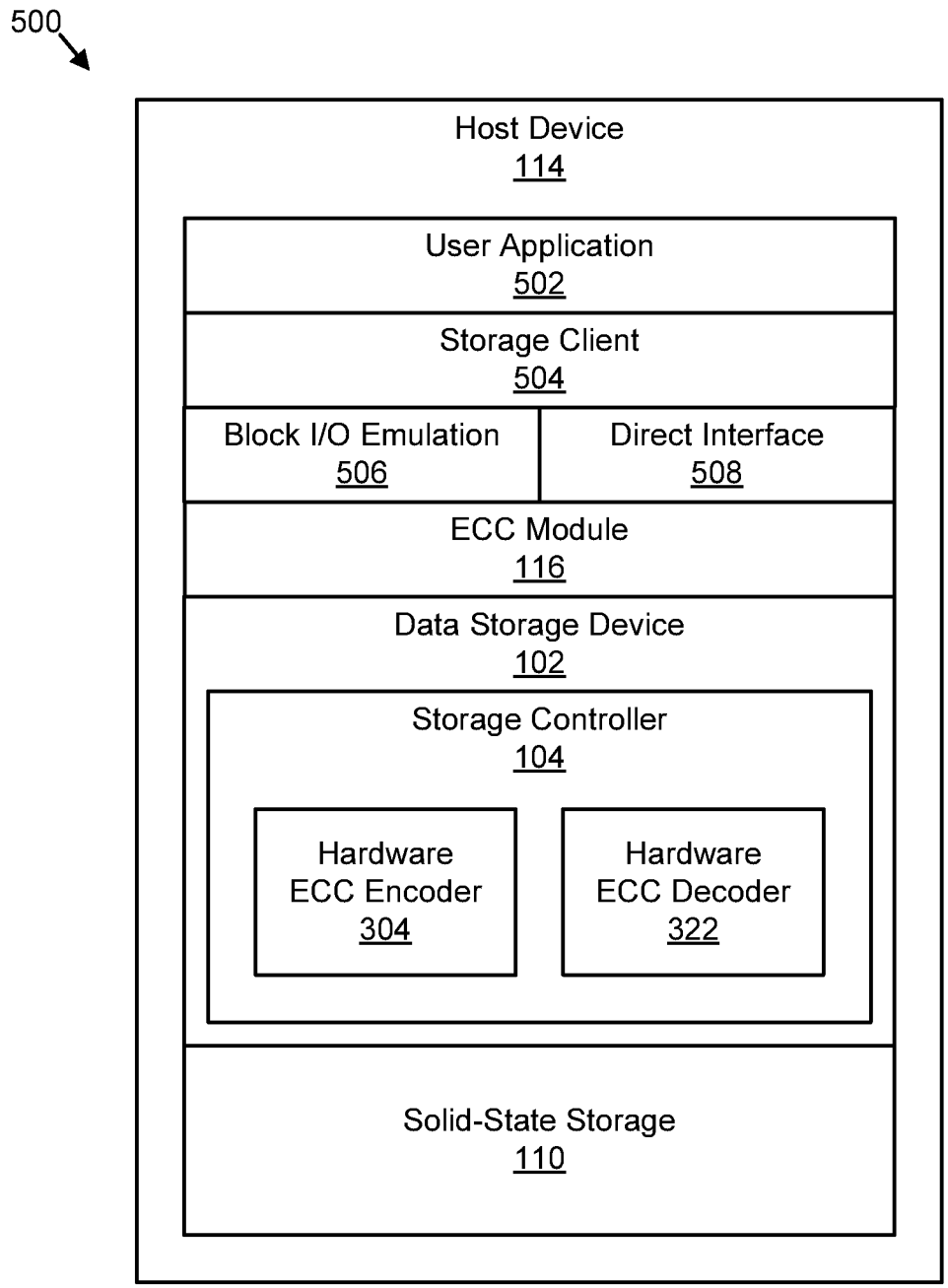
FIG. 5 is a schematic block diagram illustrating one embodiment of a host device in accordance with the present invention.

FIG. 5 depicts one embodiment 500 of a host device 114. The host device 114 may be similar, in certain embodiments, to the host device 114 depicted in FIG. 1. The depicted embodiment 500 includes a user application 502 in communication with a storage client 504. The storage client 504 is in communication with an ECC module 116 through a block input/output ("I/O") emulation layer 506 and/or a direct interface layer 508. The ECC module 116, in one embodiment, is substantially similar to the ECC module 116 of FIG. 1, described above. The ECC module 116, in the depicted embodiment 500, is in communication with the data storage device 102.

In one embodiment, the user application 502 is a software application operating on or in conjunction with the storage client 504. The storage client 504 manages file systems, files, data, and the like and utilizes the functions and features of the ECC module 116 and the data storage device 102. Representative examples of storage clients 504 include, but are not limited to, a server, a file system, an operating system, a database management system ("DBMS"), a volume manager, and the like.

In the depicted embodiment 500, the storage client 504 is in communication with the ECC module 116 through the block I/O emulation layer 506 and/or the direct interface 508. In one embodiment, at least a portion of the block I/O emulation layer 506, the direct interface 508, and/or the ECC module 116 are part of a software driver of the host device 114, such as a device driver for the data storage device 102 or the like. In a further embodiment, at least a portion of the block I/O emulation layer 506, the direct interface 508, and/or the ECC module 116 are part of the storage controller 104 or other hardware of the data storage device 102.

In one embodiment, the storage client 504 communicates with the data storage device 102 through the block I/O emulation layer 506 and/or the direct interface layer 508. Certain conventional block storage devices divide the storage media into volumes or partitions. Each volume or partition may include a plurality of sectors. One or more sectors are organized into a logical block. In certain storage systems, such as those interfacing with the Windows® operating systems, the logical blocks are referred to as clusters. In other storage systems, such as those interfacing with UNIX, Linux, or similar operating systems, the logical blocks are referred to simply as blocks. A logical block or cluster represents a smallest physical amount of storage space on the storage media that is managed by the storage manager. A block storage device may associate n logical blocks available for user data storage across the storage media with a logical block address, numbered from 0 to n. In certain block storage devices, the logical block addresses may range from 0 to n per volume or partition. In conventional block storage devices, a logical block address maps directly to a particular logical block. In conventional block storage devices, each logical block maps to a particular set of physical sectors on the storage media. In one embodiment, the data storage device 102 is a conventional block storage device.

However, in a further embodiment, the data storage device 102 may not directly or necessarily associate logical block addresses with particular physical blocks. The data storage device 102 (and/or an associated software driver) may emulate a conventional block storage interface using the block I/O emulation layer 506 to maintain compatibility with block storage clients 504 and with conventional block storage commands and protocols.

When the storage client 504 communicates through the block I/O emulation layer 506, the data storage device 102 appears to the storage client 504 as a conventional block storage device. In one embodiment, the data storage device 102 provides the block I/O emulation layer 506, which serves as a block device interface, or API. In this embodiment, the storage client 504 communicates with the data storage device 102 (and the ECC module 116) through this block device interface. In one embodiment, the block I/O emulation layer 506 receives commands and logical block addresses from the storage client 504 in accordance with this block device interface. As a result, the block I/O emulation layer 506 provides the data storage device 102 compatibility with block storage clients 504.

In one embodiment, a storage client 504 communicates with the data storage device 102 through a direct interface layer 508. In this embodiment, the data storage device 102 directly exchanges information specific to the data storage device 102 with the storage client 504. A storage client 504 using the direct interface 508 may store data on the data storage device 102 as blocks, sectors, pages, logical blocks, logical pages, erase blocks, logical erase blocks, ECC codewords, or in any other format or structure advantageous to the technical characteristics of the data storage device 102. The data storage device 102 may receive a logical address and a command from the storage client 504 and perform the corresponding operation. The data storage device 102 may support a block I/O emulation layer 506, a direct interface 508, or both a block I/O emulation layer 506 and a direct interface 508.

In one embodiment, the ECC module 116, using a software encoder of the host device 114 and/or the hardware ECC encoder 304 of the data storage device 102, encodes data sent from the storage client 504 to the data storage device 102 with ECC data. The ECC module 116, in a further embodiment, decodes requested data from the data storage device 102 for the storage client 504 using a software decoder of the host device 114 and/or the hardware ECC decoder 322 of the data storage device 102 to correct errors in the requested data.

In one embodiment, the ECC module 116 is transparent to the storage client 504, correcting data errors in requested data without any notification or indication given to the storage client 504. In a further embodiment, the hardware ECC decoder 322 operates at or near line speed (full pipeline bandwidth), such that data from the data storage device 102 suffers little or no delay in reaching the storage client 504 due to error correction. The line speed is defined by the clock rate for the hardware ECC decoder 322 and may be the same as the clock rate for the storage controller 104. In certain embodiments, the line speed may be as fast as 125 MHz. The hardware ECC decoder 322, in one embodiment, uses several parallel decoder stages in a pipeline to process and correct several ECC codewords simultaneously. Advantageously, certain embodiments use a single hardware ECC decoder 322 that includes several parallel decoder stages operating at a bit level, rather than multiple hardware decoders each operating in parallel. Bit level herein refers to the number of bits that can be inserted into/removed from the hardware ECC encoder 304 and/or hardware ECC decoder 322 on each clock cycle. The ECC module 116, the hardware ECC encoder 304, and the hardware ECC decoder 322, in one embodiment, increase the reliability of the solid-state storage media 110, extend the usable life of the solid-state storage media 110, or the like.

In the depicted embodiment 500, the hardware ECC encoder 304 and the hardware ECC decoder 322 are illustrated as part of the storage controller 104. In one embodiment, the hardware ECC encoder 304 is part of a write data pipeline 106 and the hardware ECC decoder 322 is part of a read data pipeline 108, as depicted in FIG. 3. In another embodiment, the hardware ECC encoder 304 and the hardware ECC decoder 322 operate independently of a read data pipeline 108 and/or a write data pipeline 106.

Figure 6:
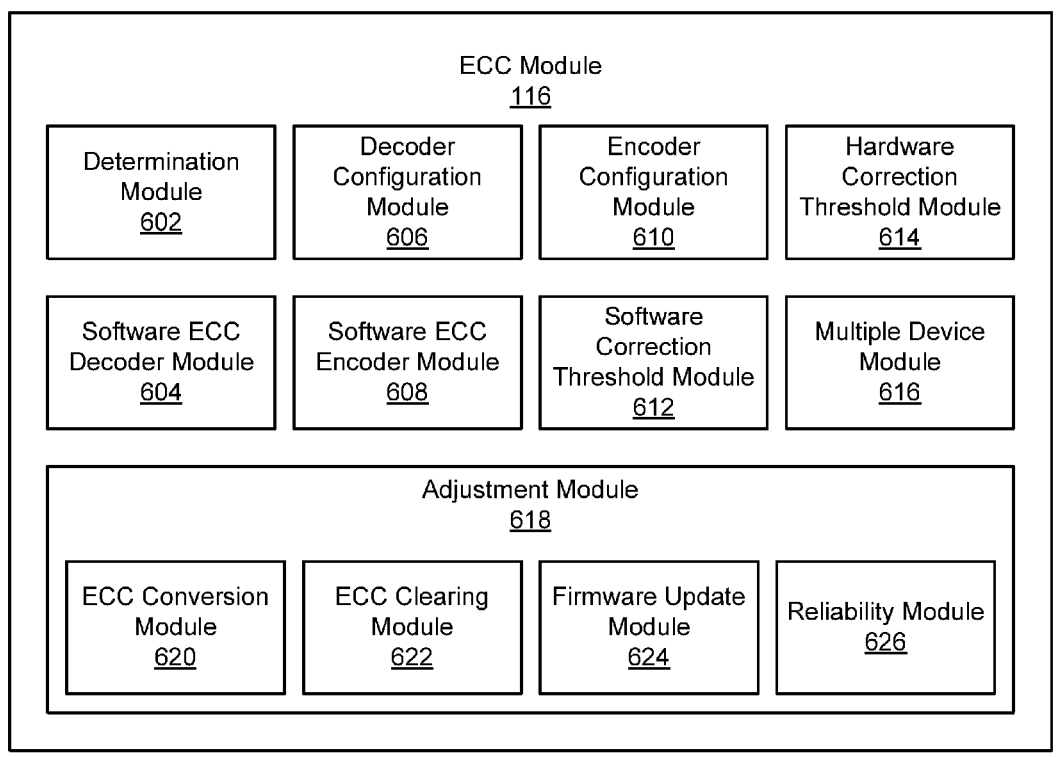
FIG. 6 is a schematic block diagram illustrating one embodiment of an error-correcting code ("ECC") module in accordance with the present invention.

FIG. 6 depicts one embodiment of the ECC module 116. In the depicted embodiment, the ECC module 116 includes a determination module 602, a software ECC decoder module 604, a decoder configuration module 606, a software ECC encoder module 608, an encoder configuration module 610, a software correction threshold module 612, a hardware correction threshold module 614, a multiple device module 616, and an adjustment module 618. The ECC module 116, in one embodiment, is substantially similar to the ECC module 116 described above with regard to FIG. 1 and FIG. 5.

In one embodiment, the determination module 602 determines a set of one or more ECC characteristics of a data storage device 102. An ECC characteristic is a definition of one or more aspects of an error correction policy for a data storage device 102 that the ECC module 116 uses to implement the error correction policy. An ECC characteristic, in one embodiment, includes data and/or a data structure indicating a property, attribute, or the like of an error correction policy, protocol, or scheme for a data storage device 102. Examples of ECC characteristics, in various embodiments, include which ECC algorithm from a plurality of ECC algorithms will be used by the hardware ECC encoder 304 and/or the hardware ECC decoder 322, an indicator that one or more ECC characteristics are reconfigurable by the ECC module 116, an ECC codeword size used in the error correction policy, a message size used in the error correction policy, a hardware ECC correction capability for the error correction policy (i.e. the maximum hardware correction threshold), a hardware ECC error detection capability for the error correction policy, a software ECC correction capability for the error correction policy, a software ECC error detection capability for the error correction policy, a hardware detection threshold, a software detection threshold, and/or another aspect of an error correction policy.

The determination module 602, in one embodiment, maintains data structures, contexts, or the like for one or more data storage devices 102, 112 of the host device 114. A data structure or context may include a set of one or more ECC characteristics for a data storage device 102, 112. In one embodiment, one or more of the ECC characteristics in a set of ECC characteristics includes an attribute (i.e. data of the characteristic, a sub-characteristic, or the like) that has a plurality of different possible attributes supported by the ECC module 116. The determination module 602, in one embodiment, populates a data structure, a context, or the like with a determined set of ECC characteristics for a data storage device 102.

For example, in one embodiment, one ECC characteristic is an ECC codeword size, and the ECC module 116 supports a plurality of different ECC codeword sizes. The determination module 602, in the example embodiment, determines an ECC codeword size for a data storage device 102. Each supported ECC codeword size, in the example embodiment, is a possible attribute of the ECC characteristic. In one embodiment, the determination module 602 selects an ECC codeword size for a data storage device 102 to satisfy a predetermined ratio between a level of data protection for the data storage device 102 and a minimum read size for the data storage device 102. In one embodiment, the level of protection against data errors associated with an ECC codeword size and the minimum read size associated with an ECC codeword size each increase with an increase in ECC codeword size.

In one embodiment, the determination module 602 queries a data storage device 102 to determine a set of one or more ECC characteristics for the data storage device 102. The data storage device 102 may return data of a set of ECC characteristics directly, alternatively the determination module 602 may derive the set of ECC characteristics from an identifier or other characteristic of the data storage device 102, such as a model number, a firmware version, a software driver version, or the like. The ECC module 116, in one embodiment, supports several different attribute values for an ECC characteristic, and different identifiers connote different attribute values. The determination module 602 may use a lookup table, a database, a configuration file, or another data structure to determine a set of one or more ECC characteristics based on an identifier associated with a storage device 102.

In one embodiment, the ECC module 116 uses the software ECC decoder module 604 to validate data and/or correct one or more data errors in ECC codewords read from the data storage device 102. The software ECC decoder module 604, in one embodiment, supports several different attribute values for one or more ECC characteristics. The software ECC decoder module 604, in one embodiment, is configurable based on a set of one or more ECC characteristics identified by the determination module 602.

The software ECC decoder module 604, in one embodiment, corrects one or more data errors in requested data from a data storage drive 102 up to a software correction threshold. In one embodiment, the software correction threshold is equal to a maximum number of correctable data errors (T) for the ECC characteristics associated with a data storage device 102. The software ECC decoder module 604, in one embodiment, corrects the one or more data errors in response to a detected number of data errors falling between a hardware correction threshold and the software correction threshold. In one embodiment, the software ECC decoder module 604 corrects each data error in a codeword up to the software correction threshold in response to the hardware ECC decoder 322 detecting a number of data errors greater than the hardware correction threshold. In a further embodiment, the hardware ECC decoder 322 corrects one or more data errors in a codeword up to the hardware correction threshold and the software ECC decoder module 604 corrects one or more remaining data errors in the codeword between the hardware correction threshold and the software correction threshold.

In one embodiment, the decoder configuration module 606 configures the software ECC decoder module 604 and/or the hardware ECC decoder 322 to operate in compliance with a set of ECC characteristics determined by the determination module 602. For example, in various embodiments, the decoder configuration module 606 configures the hardware ECC decoder 322 of a data storage device 102 to correct one or more errors in requested data up to a hardware correction threshold, configures the software ECC decoder module 604 to correct one or more data errors in requested data up to a software correction threshold, sets a codeword size, sets a message size, sets a number of correctable data errors, sets an ECC algorithm, and/or the like. In a further embodiment, the decoder configuration module 606 reconfigures the software ECC decoder module 604 and/or the hardware ECC decoder 322 to operate according to an adjusted set of ECC characteristics in response to the adjustment module 618 adjusting a set of ECC characteristics.

The decoder configuration module 606, in one embodiment, configures the software ECC decoder module 604 by calling or executing one or more software routines, setting an indicator for one or more ECC characteristics, or the like. In another embodiment, the decoder configuration module 606 configures the hardware ECC decoder 322 by setting a hardware register, sending a command, setting an indicator of an ECC characteristic, updating firmware or microcode, or the like.

In one embodiment, the software ECC encoder module 608 encodes write data with ECC data for storage on a data storage device 102. The software ECC encoder module 608, in one embodiment, is configured according to a set of one or more ECC characteristics determined by the determination module 602. In one embodiment, the software ECC encoder module 608 encodes write data in systems without a hardware ECC encoder 304, in response to a failure or error in a hardware ECC encoder 304, in response to a full or busy hardware ECC encoder 304, or the like.

In one embodiment, the encoder configuration module 610 configures the software ECC encoder module 608 and/or the hardware ECC encoder 304 to operate in compliance with a set of one or more ECC characteristics determined by the determination module 602. For example, in various embodiments, the encoder configuration module 610 sets a codeword size, sets a message size, sets a number of correctable data errors, sets an ECC algorithm, or the like. In a further embodiment, the encoder configuration module 610 reconfigures the software ECC encoder module 608 and/or the hardware ECC encoder 304 to operate according to an adjusted set of ECC characteristics in response to the adjustment module 618 adjusting a set of ECC characteristics.

The encoder configuration module 610, in one embodiment, configures the software ECC encoder module 608 by calling or executing one or more software routines, setting an indicator of an ECC characteristic, or the like. In another embodiment, the encoder configuration module 610 configures the hardware ECC encoder 304 by setting a hardware register, sending a command, setting an indicator of an ECC characteristic, updating firmware or microcode, or the like.

In one embodiment, the software correction threshold module 612 determines that a number of data errors in a codeword satisfies the software correction threshold. The number of data errors in a codeword, in various embodiments, satisfies the software correction threshold if the number is less than the software correction threshold, less than or equal to the software correction threshold, between the hardware correction threshold and the software correction threshold, greater than zero errors and less than the software correction threshold, and/or has another predefined relationship with the software correction threshold.

The hardware correction threshold module 614, in one embodiment, determines that a number of data errors in a codeword satisfies the hardware correction threshold. The number of data errors in a codeword, in various embodiments, satisfies the hardware correction threshold if the number is less than the hardware correction threshold, less than or equal to the hardware correction threshold, and/or has another predefined relationship with the hardware correction threshold. In one embodiment, the hardware correction threshold is a maximum hardware correction threshold for the hardware ECC decoder 322, i.e. a maximum number of data errors that the hardware ECC decoder 322 is capable of correcting. In a further embodiment, the determination module 602 sets the hardware correction threshold at a level below the maximum hardware correction threshold. In one embodiment, the software correction threshold is greater than the hardware correction threshold.

For example, in one embodiment, the hardware correction threshold is selected to correct data errors expected during runtime of a data storage device 102 and the software correction threshold is selected to correct data errors expected for a data retention time for requested data. In one embodiment, reliability of data in a data storage device 102 decreases over time when the data is neither read from nor written to the storage media, when the data storage device 102 is not used, or the like, and due to the nature of the storage media, the data may be more likely to have a higher number of errors as time passes. The reliability of storage media to retain the same data bit values as originally written after a period of time of non-use is referred to herein as retention time. The software correction threshold, in one embodiment, is set at a level that is greater than a number of data errors expected to occur during runtime, to account for and correct an increased number of data errors expected over the data retention time of requested data. The hardware correction threshold, in one embodiment, is set at a level to correct many or all data errors expected during routine operation of a data storage device 102, accounting for both errors during normal operation as well as errors occurring after particular data retention times.

The hardware correction threshold and the software correction threshold, in one embodiment, are selected based on data storage device characteristics of a data storage device 102. A data storage device characteristic is an aspect of the physical data storage device 102 itself, the media 110 of the data storage device 102, and/or the manufacture of the data storage device 102 and/or the media 110. Data storage device characteristics, in various embodiments, may include a device manufacturer, a silicon manufacturing process size (i.e. 50 nm, 23 nm, etc.), a device revision, a media type (i.e. SLC, MLC, etc.), or the like.

In one embodiment, the hardware correction threshold module 614 dynamically adjusts the hardware correction threshold for a data storage device 102 between zero up to a maximum hardware correction threshold. In a further embodiment, the hardware correction threshold is exactly the same as the maximum hardware correction threshold. The hardware correction threshold module 614, in a further embodiment, adjusts the hardware correction threshold in response to the adjustment module 618 adjusting an ECC characteristic corresponding to the hardware correction threshold. The maximum hardware correction threshold, in one embodiment, is the maximum number of data errors that are correctable by the hardware ECC decoder 322.

Setting the hardware correction threshold below the maximum hardware correction threshold, in various embodiments, may increase efficiency of the hardware ECC decoder 322, decrease an operating temperature of the hardware ECC decoder 322, decrease a decoding time of the hardware ECC decoder 322, decrease power consumption of the ECC decoder 322, and/or provide other benefits. In certain embodiments, the hardware correction threshold module 614 may adjust the hardware correction threshold below the maximum hardware correction threshold in response to an operating temperature exceeding a temperature threshold, an electric power usage exceeding a power threshold, an efficiency falling below an efficiency threshold, or the like.

In one embodiment, the multiple device module 616 supports several different data storage devices 102, 112, with different sets of ECC characteristics. The multiple device module 616, in one embodiment, coordinates with other modules of the ECC module 116 to support multiple data storage devices 102, 112. The determination module 602, in one embodiment, determines a first set of ECC characteristics for a first data storage device 102 and determines a second set of ECC characteristics for a second data storage device 112. The software ECC decoder module 604, in one embodiment, validates and/or corrects requested data from the first data storage device 102 according to the first set of ECC characteristics and validates and/or corrects requested data from the second data storage device 112 according to the second set of ECC characteristics. The first set of ECC characteristics and the second set of ECC characteristics, in one embodiment, provide different levels of ECC protection for the two data storage devices 102, 112. For example, in one embodiment, the first data storage device 102 and the second data storage device 112 may comprise different hardware revisions, different device ages, have different use cases, different manufacturers, different types of solid-state storage media 110, or the like.

In one embodiment, the adjustment module 618 adjusts the hardware ECC decoder 322 and/or the software ECC decoder module 604 for a data storage device 102 in accordance with an adjusted set of ECC characteristics. The adjustment module 618, in a further embodiment, adjusts the hardware ECC encoder 304 and/or the software ECC encoder module 608 in accordance with the adjusted set of ECC characteristics. In certain embodiments, the determination module 602 determines an adjusted set of ECC characteristics for the adjustment module 618, in cooperation with the adjustment module 618, or the like.

An adjusted set of ECC characteristics, in one embodiment, includes at least one different attribute selected from a plurality of attributes that the ECC module 116 supports. As described above, examples of ECC characteristics include which ECC algorithm from a plurality of ECC algorithms will be used by the hardware ECC encoder 304 and the hardware ECC decoder 322, an indicator that one or more ECC characteristics are reconfigurable by the ECC module 116, an ECC codeword size used in the error correction policy, a message size used in the error correction policy, a hardware ECC correction capability for the error correction policy (i.e. the maximum hardware correction threshold), a hardware ECC error detection capability for the error correction policy, a software ECC correction capability for the error correction policy, a software ECC error detection capability for the error correction policy, a hardware detection threshold, a software detection threshold, and/or another aspect of an error correction policy.

Once the adjustment module 618 adjusts the hardware ECC encoder 304 and/or the software ECC encoder module 608 in accordance with the adjusted set of ECC characteristics, the hardware ECC encoder 304 and/or the software ECC encoder module 608 encodes subsequent write data for storage on the data storage device 102 based on the adjusted set of ECC characteristics. Similarly, in a further embodiment, once the adjustment module 618 adjusts the hardware ECC decoder 322 and/or the software ECC decoder module 604 in accordance with the adjusted set of ECC characteristics, the hardware ECC decoder 322 and/or the software ECC decoder module 604 validates subsequent requested data read from the data storage device 102 based on the adjusted set of ECC characteristics, if the subsequent data was encoded according to the adjusted set of ECC characteristics.

In one embodiment, the adjustment module 618 makes an adjustment in response to user input indicating that a user has selected, initiated, and/or approved the adjustment. In a further embodiment, the adjustment module 618 makes an adjustment in response to an updated firmware, driver, or the like for the data storage device 102. In another embodiment, the adjustment module 618 makes an adjustment in response to decreased reliability of the data storage device 102, a change in operation mode, a signal from or indicator on the data storage device 102, or the like. For example, the adjustment module 618 and/or the determination module 602 may adjust a set of ECC characteristics in response to a user changing a use case or mode of operation of the data storage device 102 from stand alone data storage, to use as a cache device, data archive device (in which data retention time may be a factor) or vice versa, to optimize the adjusted set of ECC characteristics for the changed use case or mode of operation.

In the depicted embodiment, the adjustment module 618 includes an ECC conversion module 620, an ECC clearing module 622, a firmware update module 624, and a reliability module 626. In one embodiment, the ECC conversion module 620 converts or translates stored data on the data storage device 102 from an ECC encoding policy compliant with a set of ECC characteristics that the determination module 602 has previously identified to an ECC encoding compliant with an adjusted set of ECC characteristics of the adjustment module 618.

In one embodiment, the ECC conversion module 620 performs a bulk conversion, converting data between ECC encodings in a single consolidated process or the like. The ECC conversion module 620, in another embodiment, converts stored data opportunistically. For example, in one embodiment, the ECC conversion module 620 converts stored data as part of a garbage collection process, converts stored data as it is requested, or the like, converting stored data to an adjusted ECC encoding and clearing the original stored data.

In embodiments where the ECC conversion module 620 converts stored data in a gradual process, the data storage device 102 may store data, at least temporarily, that is encoded according to two or more different sets of ECC characteristics. In one embodiment, the ECC conversion module 620 tracks which data on the data storage device 102 is encoded according to which set of ECC characteristics, allowing the ECC module 116 to determine which set of ECC characteristics were used to encode requested data.

For example, in various embodiments, the ECC conversion module 620 stores an indicator corresponding to each ECC codeword, stores a marker indicating a current position in a conversion scan (i.e. an address or other marker with data lower than the address encoded with a first set of ECC characteristics and data greater than the address encoded with an adjusted set of ECC characteristics), or the like. In one embodiment, the ECC module 116 includes encoding and/or decoding capabilities for both an original set of ECC characteristics and at least one adjusted set of ECC characteristics, so that the ECC module 116 can continue to decode data encoded with different sets of ECC characteristics while the ECC conversion module 620 converts the stored data, and data with different encodings is stored simultaneously on the data storage device 102.

In one embodiment, the ECC clearing module 622 clears stored data encoded with an ECC encoding of a first set of ECC characteristics from the data storage device 102 in response to the adjustment module 618 adjusting the first set of ECC characteristics to an adjusted set of ECC characteristics. For example, in various embodiments, the ECC clearing module 622 may format the data storage device 102, erase, delete, trim, or otherwise clear stored data from the data storage device 102, or the like so that subsequent data stored on the data storage device 102 is encoded with the set of adjusted ECC characteristics and the data storage device 102 stores data encoded with a single set of ECC characteristics. In one embodiment, the ECC clearing module 622 clears stored data from the data storage device 102 using a TRIM function. The TRIM function, in certain embodiments, may operate and serve similar purposes to the "Data Set Management" command under the T13 technical committee command set specification maintained by INCITS, or another deallocation command.

In one embodiment, the firmware update module 624 adjusts the hardware ECC encoder 304 and/or the hardware ECC decoder 322 to operate in accordance with the set of adjusted ECC characteristics by updating a firmware of a data storage device 102 with an adjusted firmware that is configured according to the set of adjusted ECC characteristics. In a further embodiment, the firmware update module 624 adjusts the hardware ECC encoder 304 and/or the hardware ECC decoder 322 by updating microcode of a controller, or by using another hardware modification of the hardware ECC encoder 304 and/or the hardware ECC decoder 322.

In one embodiment, the reliability module 626 dynamically adjusts the hardware ECC encoder 302, the software ECC encoder module 608, the hardware ECC decoder 322, and/or the software ECC decoder module 604 according to an adjusted set of ECC characteristics in response to a reliability characteristic of a data storage device 102 failing to satisfy a reliability threshold. A reliability characteristic and an associated reliability threshold are associated with performance of the data storage device 102. A reliability characteristic, in various embodiments, may include an age of a data storage device 102, a number of read errors of a data storage device 102 such as a bit error rate or an uncorrectable bit error rate, a number of reads, writes, or the like for a data storage device 102 such as a program/erase cycle count, and/or other reliability characteristics. The determination module 602, in one embodiment, selects an adjusted set of ECC characteristics for the reliability module 626, in cooperation with the reliability module 626, or the like. In certain embodiments, the reliability module 626 communicates information of a reliability characteristic and/or of a reliability threshold to the determination module 602. The determination module 602 provides an adjusted set of ECC characteristics for the reliability module 602 that provides a greater degree of error protection than the previous set of ECC characteristics.

In a further embodiment, the reliability module 626 prompts a user of a data storage device 102 to approve adjusting the hardware ECC encoder 302, the software ECC encoder module 608, the hardware ECC decoder 322, and/or the software ECC decoder module 604 in response to a reliability characteristic failing to satisfy a corresponding reliability threshold. The reliability module 626, in one embodiment, prompts the user and receives user input from the user through the host device 114. In response to the user confirming the prompting, in one embodiment, the reliability module 626 adjusts the hardware ECC encoder 302, the software ECC encoder module 608, the hardware ECC decoder 322, and/or the software ECC decoder module 604 to operate in accordance with an adjusted set of ECC characteristics from the determination module 602, or the like.

Figure 7:
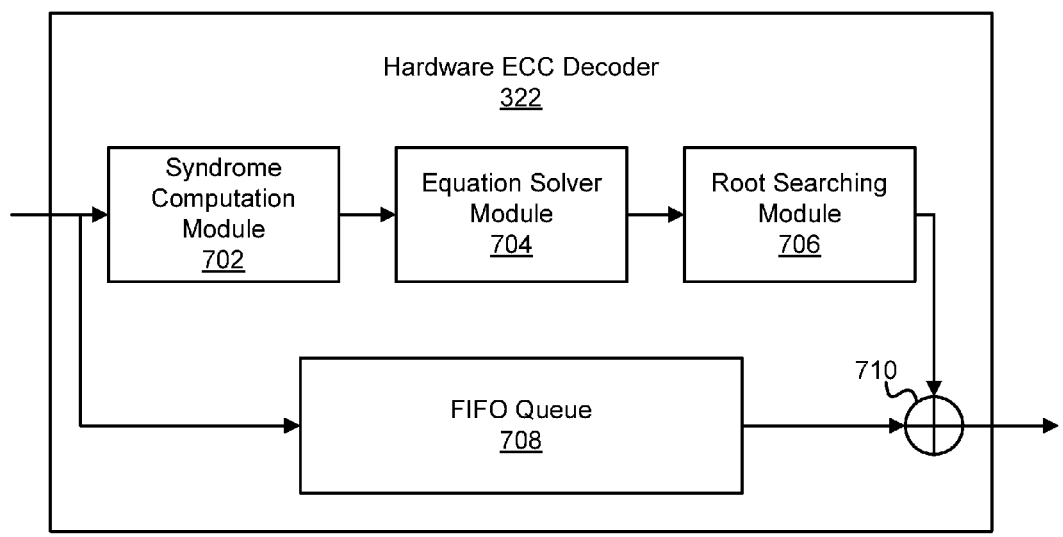
FIG. 7 is a schematic block diagram illustrating one embodiment of a hardware ECC decoder in accordance with the present invention.

FIG. 7 depicts one embodiment of the hardware ECC decoder 322. In the depicted embodiment, the hardware ECC decoder 322 includes a syndrome computation module 702, an equation solver module 704, a root searching module 706, a FIFO queue 708, and a combining element 710. In one embodiment, the hardware ECC decoder 322 is substantially similar to the hardware ECC decoder described above with regard to FIG. 3 and FIG. 5. The hardware ECC decoder 322, in the depicted embodiment, includes a pipelined BCH or Reed-Solomon decoder. In other embodiments, the hardware ECC decoder 322 may be configured to use other ECC algorithms.

The syndrome computation module 702, the equation solver module 704, and the root searching module 706, in the depicted embodiment, comprise a plurality of pipelined decoder stages 702, 704, 706. The decoder stages 702, 704, 706, in one embodiment, each perform an ECC decoding step on data from a data storage device 102. In one embodiment, the decoder stages 702, 704, 706 perform the ECC decoding steps in parallel. By performing ECC decoding steps in parallel, in one embodiment, the hardware ECC decoder 322 processes several codewords simultaneously. Each decoder stage 702, 704, 706, in one embodiment, progresses as far as possible on a decoding step until additional data is needed from a previous decoder stage 702, 704, 706. The decoder stages 702, 704, 706, in one embodiment, each maintain their own individual state, so that each decoder stage 702, 704, 706 can process different codewords independently of the other decoder stages 702, 704, 706. One or more of the decoder stages 702, 704, 706, in a further embodiment, may include data storage, such as registers, queues, buffers, memory, or the like to store codeword data, decoding metadata, or other decoding data. In another embodiment, one or more of the decoder stages 702, 704, 706 perform decoding steps on input data as the decoder stages 702, 704, 706 receive the input data, without storing or buffering the data. In one embodiment, the hardware ECC decoder 322 operates at or near line speeds, so that data experiences little or no additional delay due to decoding and error correction by the hardware ECC decoder 322.

For example, in one embodiment, the hardware ECC decoder 322 receives 64 bits of data each clock cycle. In the example, if a codeword size is 960 bytes, the hardware ECC decoder 322 is capable of receiving a full codeword each 120 clock cycles. If, in the example, a message size is 896 bytes, and the ECC code bits are 507 bits, with five unused bits, the hardware ECC decoder 322 is capable of outputting a message in 112 clock cycles. In one embodiment, the syndrome computation module 702, the equation solver module 704, and the root searching module 706 decode and correct errors in a codeword message in a few clock cycles or less, allowing the hardware ECC decoder 322 to operate at or near line speeds.

In one embodiment, the syndrome computation module 702 operates on the incoming data as fast as the data can be moved through the pipeline, similarly the root searching module 706 operates on the incoming data as fast as the data can be moved through the pipeline. The equation solver module 704 operates on a code word at a time (either with or without the ECC data) and takes some time to perform its processing. Advantageously, the equation solver module 704 is designed such that its processing time does not exceed the number of clock cycles needed to have a next ECC code word staged from the syndrome computation module 702. One way to accomplish this benefit is to choose an equation solver algorithm that provides a favorable area performance product. One such algorithm is the iBMA (inversionless Berlekamp-Massey Algorithm) algorithm.

Certain embodiments may use other algorithms such as closed form and Peterson-Gorenstein-Zierler (PGZ) algorithms. Certain embodiments of the present invention favor use of Berlekamp-Massey Algorithm (BMA), iBMA, Euclidean Algorithm (EA) or the like. This algorithm could be used in certain embodiments for the equation solver module 704. In fact for certain embodiments of the present invention, the equation solver module 704 may use any algorithm that may be used to solve the appropriate set of linear equations. Algorithms such as BMA, EA are selected in certain embodiments because these algorithms result in an overall hardware ECC decoder 322 which scales linearly in processing time with an increase in the number of errors that can be corrected (t), for at least the processing time of the equation solver module 704. Using the BMA, or EA algorithms results in a linear increase in area contrasted with the use of closed form and PGZ algorithms which scale exponentially. As used herein the term "area" refers to a number of hardware gates and those gates may comprise logic gates defined in an ASIC or logic gates programmed by way of firmware (HDL—Hardware Description Language) in an FPGA.

In certain embodiments of the present invention, the use of algorithms such as BMA, EA optimizes the runtime processing speeds for the hardware ECC decoder 322. The trade-off is that the area increases indirectly with the corresponding increase in the size of the ECC codeword. The area is directly dependent on the number of redundancy bits required in the algorithm to provide the desired level of correctable bit errors (t) as well as how wide the decoder/encoder pipeline is.

Another factor used to optimize the hardware ECC decoder 322 is that experience has shown that errors in solid-state storage arrays tend to be uniformly distributed and are thus non-clustered. Another factor that is considered is the size of the Galois Fields (GF) in the Reed Solomon (RS) types of codes. RS codes are generally weaker by about 0.6 dB than the BCH codes used in certain embodiments of the present invention, particularly where errors are uniformly distributed as is the case with solid-state storage arrays such as Flash. In designing the hardware ECC decoder 322, the coding rate is also considered. Certain existing decoders exhibit a coding rate of about 0.66. In contrast the embodiments of the present invention achieve coding rates of about 0.93. The en/decoding rate (coding rate) is the ratio of message (or data) bits to codeword bits. For example, with a 39 bit error protection level embodiment, the message size may be 7168 bits and the codeword size may be 7675 for a coding rate of 0.93.

In the depicted embodiment, the syndrome computation module 702 receives data of an ECC codeword (i.e. message data and ECC data) read from a data storage device 102. The syndrome computation module 704, in one embodiment, determines syndrome values for the received data and outputs the syndrome values to the equation solver module 704.

The equation solver module 704, in one embodiment, receives the syndrome values and determines error locator polynomials based on the syndrome values. In one embodiment, the equation solver module 704 includes a key equation solver ("KES"), that uses a Berlekamp-Massey algorithm, a Euclidean algorithm, a Peterson-Gorenstein-Zierler algorithm, or the like to determine the error locator polynomials. The equation solver module 704, in the depicted embodiment, outputs the error locator polynomials to the root searching module 706.

In the depicted embodiment, the root searching module 706 receives the error locator polynomials and determines the roots of the error locator polynomials. The root searching module 706, in one embodiment, uses the roots to locate positions of errors in the data. In one embodiment, the root searching module 706 includes a Chien searching module, a Chien searching error evaluator, or the like. In one embodiment, the hardware ECC decoder 322 uses a binary ECC algorithm, and the error locations provide enough information to correct bit errors by inverting or flipping the corresponding bits. In other embodiments, where the hardware ECC decoder 322 uses a symbol based ECC algorithm, such as a Reed-Solomon algorithm, the root searching module 706, or an additional module (not shown), determines correct values for symbols at the error locations, by solving for error weights, using the Formey algorithm, or the like.

In one embodiment, the FIFO queue 708 stores or buffers message data of the received codeword while the syndrome computation module 702, the equation solver module 704, and the root searching module 706 are performing ECC decoding steps. In one embodiment, the ECC code data is removed from the codeword as the data enters the FIFO queue 708. In a further embodiment, the FIFO queue 708 stores message data and/or codeword data for several ECC codewords that the decoder stages 702, 704, 706 are currently processing. The combining element 710, in one embodiment, is an XOR operator that combines an output of the FIFO queue 708 with an output of the root searching module 706, with binary ones at the error positions, to flip the bits corresponding to data errors to correct the message data and/or codeword data. In other embodiments, the combining element 710 may otherwise correct message data and/or codeword data based on error locations and/or correction values from the root searching module 706.

In one embodiment, the syndrome computation module 702, the equation solver module 704, and the root searching module 706 decode and correct data in accordance with a set of one or more ECC characteristics. The hardware ECC decoder 322, in one embodiment, reports the set of one or more ECC characteristics to the ECC module 116. Some ECC characteristics of the hardware ECC decoder 322 may not be dynamically configurable, but may be configurable with a firmware update, a microcode update, or the like. Other ECC characteristics of the hardware ECC decoder 322, such as a hardware correction threshold, or the like, may be dynamically configurable.

The syndrome computation module 702, the equation solver module 704, and the root searching module 706, in a further embodiment, are capable of correcting a number of data errors up to a maximum hardware correction threshold. The maximum hardware correction threshold, in one embodiment, affects a size (i.e. a number of logic gates or other circuit elements) of the syndrome computation module 702, the equation solver module 704, and/or the root searching module 706. Decoding and correcting data using the hardware ECC decoder 322, in one embodiment, is faster than decoding and correcting data using the software ECC decoder module 604 of the ECC module 116. Selecting a maximum hardware correction threshold to correct data errors expected during runtime of a data storage device 102, in one embodiment, may increase read throughput speeds of the data storage device 102 at a cost of increased size (i.e. a number of logic gates or other circuit elements) of the hardware ECC decoder 322. In one embodiment, a maximum hardware correction threshold is selected that is less than a number of errors expected during runtime of a data storage device 102, to conserve logic gates, programmable elements, or to meet other hardware architectural or cost constraints. In a further embodiment, an ECC algorithm or another ECC characteristic for the hardware ECC decoder 322 is selected to meet size, architectural, cost, or other constraints.

In one embodiment, the maximum hardware correction threshold is selected to satisfy a predefined size threshold, such as a number of available logic gates or the like. In another embodiment, the maximum hardware correction threshold is selected to correct an amount of data errors expected during runtime of the data storage device 102. In one embodiment, the ECC module 116 dynamically configures the syndrome computation module 702, the equation solver module 704, and the root searching module 706 to correct a number of data errors up to a hardware correction threshold that is less than or equal to the maximum hardware correction threshold.

In one embodiment, the equation solver module 704 determines or detects a total number of errors in message data of a codeword. If the total number of errors does not satisfy the hardware correction threshold, the hardware ECC decoder 322, in one embodiment, sends the codeword to the software ECC decoder module 604 for correction. In a further embodiment, if the total number of errors does not satisfy the hardware correction threshold, the hardware ECC decoder 322 corrects a portion of the detected errors, such as a portion up to the hardware correction threshold, up to the maximum hardware correction threshold, or the like, and sends the codeword to the software ECC decoder module 604 for further correction. As described above with regard to the hardware ECC decoder of FIG. 3, in one embodiment, depending on the ECC algorithm used, data errors in a codeword may have a detectable order, allowing the hardware ECC decoder 322 to detect and correct a first set of data errors, and the software decoder of the ECC module 116 to skip or pass over the first set of data errors to correct a second set of data errors.

In one embodiment, the hardware ECC decoder 322 includes a controller, or the like, that manages the flow of data through the hardware ECC decoder 322, assigns jobs to the decoder stages 702, 704, 706, communicates with the ECC module 116, and/or performs other decoder tasks. In a further embodiment, a controller may manage one or more queues, buffers, or the like to assist the syndrome computation module 702, the equation solver module 704, and the root searching module 706 to operate on several codewords simultaneously in parallel.

Figure 8:
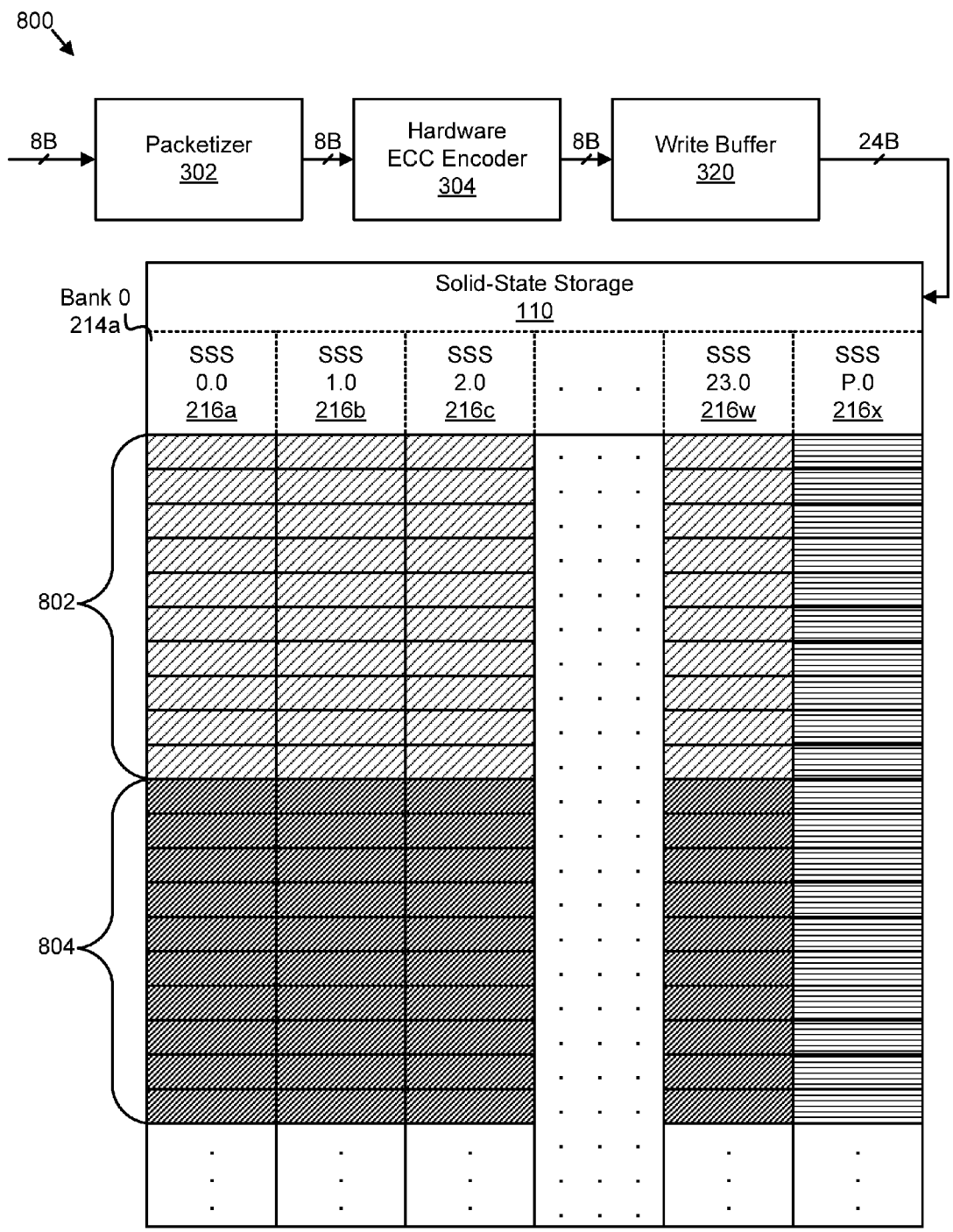
FIG. 8 is a schematic block diagram illustrating one embodiment of a system for ECC encoding in accordance with the present invention.

FIG. 8 depicts one embodiment of a system 800 for ECC encoding. The system 800, in the depicted embodiment, includes the packetizer 302, the hardware ECC encoder 304, the write buffer 320, and the solid-state storage media 110. The packetizer 302, the hardware ECC encoder 304, the write buffer 320, and the solid-state storage media 110, in one embodiment, are substantially similar to the packetizer 302, the hardware ECC encoder 304, the write buffer 320, and the solid-state storage media 110 described above. As described above with regard to the packetizer 302 of FIG. 3, in one embodiment, the write data pipeline 106 (and the system 800) does not include a packetizer, and the hardware ECC encoder 304 may encode write data directly into ECC codewords. In one embodiment, in place of the solid-state storage media 110, the system 800 includes a different type of data storage media, such as RAM, a hard disk drive, an optical drive, or other data storage media.

In the depicted embodiment, the packetizer 302 receives a stream of write data. The stream of write data, in the depicted embodiment, is an 8 byte (64 bit) stream. The packetizer 302, in one embodiment, packages the write data into packets. For example, in one embodiment, the packetizer 302 packages the write data into 520 byte packets, with 512 bytes of write data and 8 byte headers. In certain embodiments, the size of the packets is configurable by the storage controller 104, the user, the host device 114, or the like. The hardware ECC encoder 304, in the depicted embodiment, receives packets from the packetizer 302, determines ECC data for the packets, and packages the packets into ECC codewords. In one embodiment, the size of an ECC codeword is independent of a size of a packet. For example, the hardware ECC encoder 304 may package a plurality of packets into a single ECC codeword, break a single packet into a plurality of ECC codewords, or the like.

In one example embodiment, (N, K, T)=(1,913, 1,792, 11) and the hardware ECC encoder 304 packages packets into codewords of 240 bytes (N=1,913 bits+7 padding bits) with 224 byte (K=1,792 bit) messages and 121 bits of ECC data (N−K=121 bits). In another example embodiment, (N, K, T)=(7,675, 7,168, 39) and the hardware ECC encoder 304 packages packets into codewords of 960 bytes (N=7,675 bits+5 padding bits) with 896 byte (K=7,168 bit) messages and 507 bits of ECC data (N−K=507 bits). In an additional example embodiment, (N, K, T)=(35,320, 32,776, 159), and the hardware ECC encoder 304 packages packets into codewords of 4,415 bytes (N=35,320 bits) with 4,097 byte (K=32, 776 bit) messages and 318 bytes of ECC data (N−K=2,544 bits). One of skill in the art, in view of this disclosure, will recognize other values for N, K, and T based on selected ECC algorithms and other ECC characteristics.

The hardware ECC encoder 304, in the depicted embodiment, sends ECC codewords to the write buffer 320. The write buffer 320, in one embodiment, is sized to fit at least one ECC codeword. In a further embodiment, the write buffer 320 is sized to fit at least one page (or logical page) of data. In another embodiment, the write buffer 320 is sized to fit at least two pages (or logical pages) of data. The write buffer 320, in the depicted embodiment, writes buffered ECC codewords to an array of solid-state storage media 110. In a further embodiment, the write buffer 320 writes buffered ECC codewords to a different type of data storage media.

The array of solid-state storage media 110, in the depicted embodiment, includes 25 solid-state storage elements 216.

The solid-state storage elements 216, in various embodiments, may include solid-state storage dies, chips, or the like, as described above with regard to FIG. 2. The first 24 solid-state storage elements 216a-w, in the depicted embodiment, store data of ECC codewords 802, 804. The 25th solid-state storage element 216x, in the depicted embodiment, stores parity data generated from the data of the ECC codewords 802, 804. The solid-state storage element 216x storing parity data, in one embodiment, is a dedicated parity storage element 216x that stores parity data. In a further embodiment, parity data may be rotated among the solid-state storage elements 216.

In one embodiment, each depicted row of a single solid-state storage element 216 represents one byte. The parity data on a single row (for example one byte) of a parity storage element 216x may comprise the parity data for all the bytes of the same row of the first 24 solid-state storage elements 216a-w. In one embodiment, an ECC codeword size is selected such that codewords substantially fit evenly within pages, logical pages, or other boundaries of the solid-state storage media 110. For example, in one embodiment, an ECC codeword size is selected that has a 24 byte alignment.

In the depicted embodiment, for example, the first ECC codeword 802 and the second ECC codeword 804 are each 240 bytes long, with 10 bytes of each codeword 802, 804 stored on each of the first 24 solid-state storage elements 216a-w. In a further embodiment, an ECC codeword size is selected that does not align with a boundary of the solid-state storage media 110, and codewords span storage element boundaries, such as a codeword that does not have a 24 byte alignment.

In one embodiment, one or more ECC codewords are stored across page boundaries. In a further embodiment, ECC codewords are not stored across page boundaries, and one or more extra bytes of a page may be left empty if ECC codewords do not fill a page. For example, if each of the solid-state storage elements 216 comprises a die page with a capacity of 2 kilobytes (2048 bytes), then each solid-state storage element 216, in one embodiment, stores 10 bytes from each of 204 different ECC codewords and 8 bytes are left over in each solid-state storage element 216.

FIG. 9 depicts various example embodiments 900 of ECC characteristics 902. The error correction characteristics 902, in the depicted embodiment 900, include, among other settings, one or more hardware and/or software correction thresholds. In the depicted embodiment 900, a number of correctable data errors is represented by a "(software correction threshold)b(hardware correction threshold)." In one embodiment, the ECC module 116 uses the ECC characteristics 902 to divide data error correction between the software ECC decoder module 604 and the hardware ECC decoder 322.

The first ECC characteristic 902a, in the depicted embodiment 900, is "11b3", with a software correction threshold of 11 and a hardware correction threshold of 3. In the depicted embodiment 900, for the first ECC characteristic 902a, if a codeword has 1-3 data errors it satisfies the hardware correction threshold and the hardware ECC decoder 322 corrects the errors. For the first ECC characteristic 902a, in the depicted embodiment 900, if a codeword has 4-11 data errors, it satisfies the software correction threshold, and the software ECC decoder module 604 corrects the errors.

The second ECC characteristic 902b, in the depicted embodiment 900, is "17b8," with a software correction threshold of 17 and a hardware correction threshold of 8. In the depicted embodiment 900, for the second ECC characteristic 902b, the software correction threshold and the hardware correction threshold overlap, so if a codeword has 1-8 data errors it satisfies both the hardware correction threshold and the software correction threshold and the ECC module 116 may assign either the hardware ECC decoder 322 or the software ECC decoder module 604 to correct the errors. In one embodiment, which module, the hardware ECC decoder 322 or the software ECC decoder module 604 assigned to handle numbers of error in this overlapping range is configurable either manually and/or dynamically in response to storage heuristics. For the second ECC characteristic 902b, in the depicted embodiment 900, if a codeword has 9-17 data errors, it satisfies the software correction threshold but not the hardware correction threshold, and the software ECC decoder module 604 corrects the errors. Similarly, in the depicted embodiment 900, the third ECC characteristic 902c has overlapping software and hardware correction thresholds for values of 2-3.

The fourth ECC characteristic 902d, in the depicted embodiment 900 is "39b4" and the fifth ECC characteristic 902e is "159b24". For the fourth ECC characteristic 902d and the fifth ECC characteristic 902e, in the depicted embodiment 900, the hardware ECC decoder 322 corrects data errors up to the hardware correction threshold and the software ECC decoder module 604 corrects data errors between the hardware correction threshold and the software correction threshold. In one embodiment, the software ECC decoder module 604 corrects each data error in a codeword with a number of data errors satisfying the software correction threshold. In a further embodiment, the hardware ECC decoder 322 corrects a number of data errors in a codeword up to the hardware correction threshold, and passes the codeword to the software ECC decoder module 604 to correct additional data errors up to the software correction threshold. In one embodiment, if the number of data errors in a codeword exceeds the software correction threshold, the ECC module 116 sends the codeword, an identifier of the codeword, or the like to the master controller 224, the storage controller 104, or the like for correction using parity data, RAID, a backup copy, or the like.

FIG. 10 depicts various embodiments 1000 of other ECC characteristics 1002, 1004, illustrating effects of adjustments to the ECC characteristics 1002, 1004. Generally, the code rate 1002 will vary between zero and one. The code rate 1002 tends to represent an efficiency at which the ECC protection relates to the costs of performing the ECC protection. Decreasing the code rate 1002, the ratio of message size to codeword size, in certain embodiments, increases the strength of error correction. Decreasing the code rate 1002, in one embodiment, increases the amount of ECC data relative to user message data, allowing more data errors to be corrected in the user data.

Decreasing the code rate 1002, in certain embodiments, can increase a minimum read size 1006, if the code rate 1002 is decreased by increasing a codeword size without increasing a message size, to accommodate an increased amount of ECC data. The minimum read size is the smallest amount of data from a data storage device 102 that storage can safely read and still validate the integrity of the data read. For most ECC algorithms, the minimum read size 1006 is equal to the codeword size. Because of the minimum read size 1006, in certain embodiments, a request for an amount of data smaller than the minimum read size 1006 still requires the full minimum read size 1006 to be read so that the hardware ECC decoder 322 and/or the software ECC decoder module 604 can correct any errors in the requested data.

Decreasing the code rate 1002, in certain embodiments, also increases the metadata overhead 1008, due to the increased amount of ECC data relative to message data. The increased metadata overhead 1008, in some embodiments, may decrease performance/throughput 1010 as the code rate 1002 decreases. Runtime data integrity 1012, in certain embodiments, increases with decreasing code rate 1002, because more data errors can be corrected. Similarly, data retention 1014, in certain embodiments, also increases with decreasing code rate 1002, because more data errors can be corrected.

Increasing the codeword length 1004, in certain embodiments, is another way to increase the strength of error correction, because the strength of ECC protection increases according to a power law distribution for increasing codeword lengths 1004. Increasing the codeword length 1004, in one embodiment, increases the minimum read size 1006, because an entire ECC codeword is read at a time to correct errors in even a small portion of the ECC codeword. Increasing the codeword length 1004, in certain embodiments, can increase the robustness of ECC protection without changing the metadata overhead 1008, if the code rate 1002 remains unchanged or close to the same.

Optimally, if the code rate 1002 remains unchanged, an increased codeword length 1004 may not decrease the throughput 1010. However, in certain embodiments, increasing the codeword length 1004 can minimally decrease performance and/or throughput 1010 because of the increased minimum read size 1006. The decrease in performance and/or throughput 1010 due to increased codeword length 1004, in one embodiment, can be mitigated based on the design of the hardware ECC encoder 304 and/or the hardware ECC decoder 322. For example, a hardware ECC encoder 304 that includes parallel decoder stages, a wider data path, or the like may have little or no decreased performance/throughput 1010 due to an increased codeword length 1004. Runtime data integrity 1012, in certain embodiments, increases with increasing codeword length 1004 as does data retention 1014 because of the increased strength of ECC protection with increasing codeword length 1004.

Flow Charts

Figure 11:
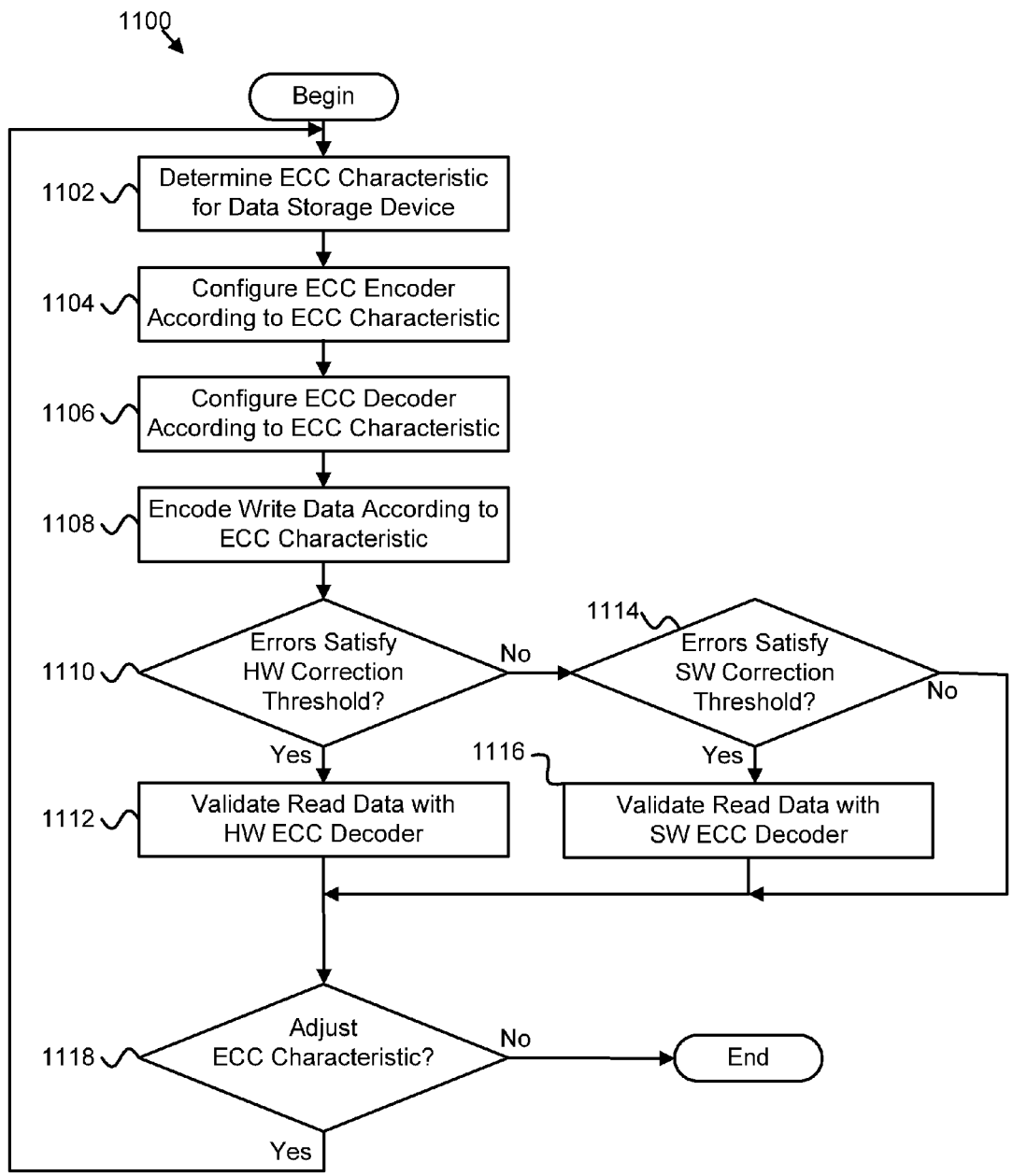
FIG. 11 is a schematic flow chart diagram illustrating one embodiment of a method for providing error correction in accordance with the present invention.

FIG. 11 depicts one embodiment of a method 1100 for providing error correction. In the depicted embodiment, the method 1100 begins, and the determination module 602 determines 1102 a set of one or more ECC characteristics for one or more data storage devices 102, 112. The encoder configuration module 610, in the depicted embodiment, configures 1104 the software ECC encoder module 608 and/or the hardware ECC encoder 304 according to the set of ECC characteristics. The decoder configuration module 606, in the depicted embodiment, configures 1106 the software ECC decoder module 604 and/or the hardware ECC decoder 322 according to the set of ECC characteristics.

The hardware ECC encoder 304 and/or the software ECC encoder module 608, in the depicted embodiment, encodes 1108 write data for the data storage device 102 according to the set of ECC characteristics. The hardware correction threshold module 614, in the depicted embodiment, determines 1110 whether a number of data errors in read data from the data storage device 102 satisfies a hardware correction threshold. If the hardware correction threshold module 614 determines 1110 that the number of data errors satisfies the hardware correction threshold, in the depicted embodiment, the hardware ECC decoder 322 validates 1112 read data.

If the hardware correction threshold module 614 determines 1110 that the number of data errors does not satisfy the hardware correction threshold, in the depicted embodiment, the software correction threshold module 612 determines 1114 whether the number of data errors in the read data satisfies a software correction threshold. If the number of data errors satisfies the software correction threshold, in the depicted embodiment, the software ECC decoder module 604 validates 1116 the read data. If the number of data errors does not satisfy the software correction threshold, in one embodiment, the data errors are not correctable by the hardware ECC decoder 322 or the software ECC decoder module 604. In one embodiment, if the number of data errors does not satisfy the software correction threshold, the software ECC decoder module 604 (or the software correction threshold module 612) may send an error, send an interrupt, send the read data to the master controller 224 for further correction, or the like.

In the depicted embodiment, the adjustment module 618 determines 1116 whether or not to adjust the set of ECC characteristics. For example, in various embodiments, the adjustment module 618 may determine 1116 to adjust the set of ECC characteristics in response to user input, in response to a firmware or driver update, in response to a reliability characteristic exceeding a predefined threshold, or the like. In the depicted embodiment, if the adjustment module 618 determines 1116 not to adjust the set of ECC characteristics, the method 1100 ends. If the adjustment module 618 determines 1116 to adjust the set of ECC characteristics, in the depicted embodiment, the method 1100 starts over with a set of adjusted ECC characteristics in place of the previous set of ECC characteristics.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    determining at least one error-correcting code ("ECC") characteristic of a data storage device, the at least one ECC characteristic comprising a hardware correction threshold for a hardware ECC decoder and a software correction threshold for a software ECC decoder, wherein the hardware correction threshold and the software correction threshold are based on a device version for the data storage device;
    validating requested data read from the data storage device using the hardware ECC decoder; and
    validating, based on the at least one ECC characteristic, requested data read from the data storage device using the software ECC decoder in response to the data satisfying the software correction threshold.

2. The method of claim 1, further comprising configuring the software ECC decoder to validate the requested data up to the software correction threshold number of data errors in the requested data.

3. The method of claim 1, further comprising,
    correcting one or more errors in the requested data using the hardware ECC decoder in response to a detected number of errors in the requested data satisfying the hardware correction threshold; and
    correcting one or more errors in the requested data using the software ECC decoder in response to a detected number of errors in the requested data satisfying the software correction threshold, wherein the software correction threshold is greater than the hardware correction threshold.

4. The method of claim 3, wherein the software ECC decoder corrects one or more data errors in the requested data up to the software correction threshold in response to a detected number of the one or more data errors falling between the hardware correction threshold and the software correction threshold.

5. The method of claim 3, wherein the hardware ECC decoder corrects a portion of the data errors up to the hardware correction threshold and the software ECC decoder corrects a portion of the data errors between the hardware correction threshold and the software correction threshold.

6. The method of claim 3, wherein the hardware correction threshold is selected to correct data errors expected during runtime of the data storage device and the software correction threshold is selected to correct data errors expected for a data retention time for the requested data.

7. The method of claim 1, wherein the ECC characteristic comprises an ECC codeword size selected from a plurality of supported ECC codeword sizes to satisfy a predetermined ratio between a level of data protection and a minimum read size, wherein the level of data protection associated with the ECC codeword size and the minimum read size associated with the ECC codeword size each increase with an increase in ECC codeword size.

8. The method of claim 1, further comprising configuring at least one of the hardware ECC decoder and the software ECC decoder to operate in compliance with the ECC characteristic of the data storage device.

9. An apparatus comprising:
a determination module configured to determine at least one error-correcting code ("ECC") characteristic of a data storage device, the at least one ECC characteristic comprising a hardware correction threshold for a hardware ECC decoder and a software correction threshold for a software ECC decoder, wherein the hardware correction threshold and the software correction threshold are based on a program/erase cycle count for the data storage device;
an ECC module configured to validate requested data read from the data storage device using the hardware ECC decoder; and
a software ECC decoder module configured to validate, based on the at least one ECC characteristic, requested data read from the data storage device using the software ECC decoder in response to the data failing to satisfy the hardware correction threshold.

10. The apparatus of claim 9, further comprising a decoder configuration module configured to configure the software ECC decoder module to validate the requested data up to the software correction threshold number of data errors in the requested data.

11. The apparatus of claim 9, wherein,
the hardware ECC decoder is configured to correct one or more errors in the requested data in response to a detected number of errors in the requested data satisfying the hardware correction threshold; and
the software ECC decoder module is configured to correct one or more errors in the requested data using the software ECC decoder in response to a detected number of errors in the requested data satisfying the software correction threshold, wherein the software correction threshold is greater than the hardware correction threshold.

12. The apparatus of claim 11, wherein the software ECC decoder module is configured to correct one or more data errors in the requested data up to the software correction threshold in response to a detected number of the one or more data errors falling between the hardware correction threshold and the software correction threshold.

13. The apparatus of claim 9, further comprising a decoder configuration module configured to configure at least one of the hardware ECC decoder and the software ECC decoder module to operate in compliance with the ECC characteristic of the data storage device.

14. The apparatus of claim 9, wherein the ECC characteristic comprises an ECC codeword size selected from a plurality of supported ECC codeword sizes to satisfy a predetermined ratio between a level of data protection and a minimum read size, wherein the level of data protection associated with the ECC codeword size and the minimum read size associated with the ECC codeword size each increase with an increase in ECC codeword size.

15. A system comprising:
a data storage device;
a hardware error-correcting code ("ECC") decoder disposed in hardware of the data storage device, the hardware ECC decoder configured to validate requested data read from the data storage device; and
an ECC module, the ECC module comprising,
a determination module configured to query the data storage device to determine at least one ECC characteristic of the data storage device, the at least one ECC characteristic comprising a hardware correction threshold for the hardware ECC decoder and a software correction threshold for a software ECC decoder, wherein the hardware correction threshold and the software correction threshold are based on a device version for the data storage device; and
a software ECC decoder module configured to validate, based on the at least one ECC characteristic, requested data read from the data storage device using the software ECC decoder in response to the data satisfying the software correction threshold.

16. The system of claim 15, wherein the ECC module further comprises a decoder configuration module configured to configure the hardware ECC decoder to validate the requested data up to the hardware correction threshold number of data errors in the requested data and that configures the software ECC decoder module to validate the requested data up to the software correction threshold number of data errors in the requested data.

17. The system of claim 15, further comprising a host device, wherein the ECC module is installed on the host device and the host device is in communication with the data storage device.

18. The system of claim 17, wherein the ECC module is part of a device driver executing on the host device and the hardware ECC decoder is part of a hardware controller of the data storage device.

19. The system of claim 15, further comprising a second data storage device, wherein the determination module is configured to determine a second ECC characteristic of the second data storage device and the software ECC decoder module is configured to validate at least a portion of requested data read from the second data storage device using the software ECC decoder configured according to the second ECC characteristic.

\* \* \* \* \*